(12) United States Patent
Wagner

(10) Patent No.: US 9,811,434 B1
(45) Date of Patent: Nov. 7, 2017

(54) PREDICTIVE MANAGEMENT OF ON-DEMAND CODE EXECUTION

(71) Applicant: Amazon Technologies, Inc., Seattle, WA (US)

(72) Inventor: Timothy Allen Wagner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 14/971,882

(22) Filed: Dec. 16, 2015

(51) Int. Cl.
*G06F 9/45* (2006.01)
*G06F 9/455* (2006.01)
*G06F 9/46* (2006.01)
*G06F 11/30* (2006.01)
*G06F 9/50* (2006.01)
*G06F 9/54* (2006.01)

(52) U.S. Cl.
CPC ........... *G06F 11/30* (2013.01); *G06F 8/43* (2013.01); *G06F 8/433* (2013.01); *G06F 8/443* (2013.01); *G06F 8/4441* (2013.01); *G06F 9/455* (2013.01); *G06F 9/45516* (2013.01); *G06F 9/5077* (2013.01); *G06F 9/54* (2013.01); *G06F 11/301* (2013.01); *G06F 11/3003* (2013.01); *G06F 11/3006* (2013.01)

(58) Field of Classification Search
None
See application file for complete search history.

(56) References Cited

U.S. PATENT DOCUMENTS 5,283,888 A  2/1994  Dao et al.
5,970,488 A  10/1999  Crowe et al.
(Continued)

FOREIGN PATENT DOCUMENTS

EP          2663052 A1    11/2013
WO    WO 2009/137567 A1  11/2009
(Continued)

OTHER PUBLICATIONS

Adapter Pattern, Wikipedia, https://en.wikipedia.org/w/index.php?title=Adapter_pattern&oldid=654971255, [retrieved May 26, 2016], 6 pages.
(Continued)

*Primary Examiner* — Charles Swift
(74) *Attorney, Agent, or Firm* — Knobbe, Martens, Olson & Bear, LLP

(57) ABSTRACT

Systems and methods are described for monitoring code execution within an on-demand code execution environment or other distributed code execution environment. The distributed, asynchronous nature of such environment can make determining the interactions between code executions difficult relative to traditional, non-distributed systems. The present disclosure enables the interrelations between code executions to be monitored by injecting monitoring information into the calls between those code executions. The monitoring information may be propagated through calls, such that a "path" or "trace" of code executions and calls can be determined. Data generated based on the monitoring information can be used to generate a profile for a set of code, so that a developer or other user may easily debug or optimize execution of the code.

23 Claims, 13 Drawing Sheets

(56) References Cited

U.S. PATENT DOCUMENTS

| | | |
|---|---|---|
| 6,708,276 B1 | 3/2004 | Yarsa et al. |
| 7,036,121 B1 | 4/2006 | Casabona et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,065,676 B1 | 11/2011 | Sahai et al. |
| 8,095,931 B1 | 1/2012 | Chen et al. |
| 8,146,073 B2 | 3/2012 | Sinha |
| 8,166,304 B2 | 4/2012 | Murase et al. |
| 8,171,473 B2 | 5/2012 | Lavin |
| 8,336,079 B2 | 12/2012 | Budko et al. |
| 8,429,282 B1 | 4/2013 | Ahuja |
| 8,448,165 B1 | 5/2013 | Conover |
| 8,631,130 B2 | 1/2014 | Jackson |
| 8,725,702 B1 | 5/2014 | Raman et al. |
| 8,756,696 B1 | 6/2014 | Miller |
| 8,825,964 B1 | 9/2014 | Sopka et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 7/2015 | Oh et al. |
| 9,092,837 B2 | 7/2015 | Bala et al. |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 | 12/2015 | Orveillon et al. |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2006/0184669 A1* | 8/2006 | Vaidyanathan ......... G06F 9/485 709/224 |
| 2006/0248195 A1 | 11/2006 | Toumura et al. |
| 2007/0094396 A1 | 4/2007 | Takano et al. |
| 2007/0130341 A1 | 6/2007 | Ma |
| 2008/0028409 A1 | 1/2008 | Cherkasova et al. |
| 2008/0082977 A1 | 4/2008 | Araujo et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Husain |
| 2009/0025009 A1 | 1/2009 | Brunswig et al. |
| 2009/0055810 A1 | 2/2009 | Kondur |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0269109 A1 | 10/2010 | Cartales |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0134761 A1 | 6/2011 | Smith |
| 2011/0141124 A1 | 6/2011 | Halls et al. |
| 2011/0153838 A1 | 6/2011 | Belkine et al. |
| 2011/0184993 A1 | 7/2011 | Chawla et al. |
| 2011/0265164 A1 | 10/2011 | Lucovsky |
| 2012/0054744 A1 | 3/2012 | Singh et al. |
| 2012/0072914 A1 | 3/2012 | Ota |
| 2012/0096468 A1 | 4/2012 | Chakravorty et al. |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0042234 A1 | 2/2013 | DeLuca et al. |
| 2013/0054927 A1 | 2/2013 | Raj et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0151648 A1 | 6/2013 | Luna |
| 2013/0179574 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco et al. |
| 2013/0198319 A1 | 8/2013 | Shen et al. |
| 2013/0205092 A1 | 8/2013 | Roy et al. |
| 2013/0219390 A1 | 8/2013 | Lee et al. |
| 2013/0227641 A1 | 8/2013 | White et al. |
| 2013/0232480 A1 | 9/2013 | Winterfeldt et al. |
| 2013/0263117 A1 | 10/2013 | Konik et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346987 A1 | 12/2013 | Raney et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0380085 A1 | 12/2014 | Rash et al. |
| 2015/0074659 A1 | 3/2015 | Madsen et al. |
| 2015/0120928 A1 | 4/2015 | Gummaraju et al. |
| 2015/0235144 A1 | 8/2015 | Gusev et al. |
| 2015/0350701 A1 | 12/2015 | Lemus et al. |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0224360 A1 | 8/2016 | Wagner et al. |
| 2016/0224785 A1 | 8/2016 | Wagner et al. |

(56) References Cited

U.S. PATENT DOCUMENTS

| | | |
|---|---|---|
| 2016/0239318 A1 | 8/2016 | Wagner |
| 2016/0299790 A1 | 10/2016 | Thompson |
| 2016/0301739 A1 | 10/2016 | Thompson |

FOREIGN PATENT DOCUMENTS

| | | |
|---|---|---|
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |

OTHER PUBLICATIONS

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Nakajima, J., et al., Optimizing Virtual Machines Using Hybrid Virtualization, SAC '11, Mar. 21-25, 2011, TaiChung, Taiwan, pp. 573-578.

Qian, H. and D.Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2016/026514 dated Jun. 8, 2016.

International Search Report and Written Opinion in PCT/US2016/026520 dated Jul. 5, 2016.

International Search Report and Written Opinion in PCT/US2016/054774 dated Dec. 16, 2016.

Espadas et al. "A tenant-based resource allocation model for scaling Software-as-a-Service applications over cloud computing infrastructures." Future Generation Computer Systems 29.1 (2013): 273-286.Retrieved on [Apr. 21, 2016] Retrieved from the Internet: URLhttp://www.sciencedirect.com/science/articie/pii/S0167739X1100210X.

Vaquero, et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.

International Search Report and Written Opinion in PCT/US2015/052810 dated Dec. 17, 2015, 18 pages.

International Search Report and Written Opinion in PCT/US2015/052838 dated Dec. 18, 2015, 23 pages.

International Search Report and Written Opinion in PCT/US2015/052833 dated Jan. 13, 2016, 17 pages.

International Search Report and Written Opinion in PCT/US2015/064071 dated Mar. 16, 2016, 17 pages.

International Search Report and Written Opinion in PCT/US2016/016211 dated Apr. 13, 2016 11 pages.

* cited by examiner

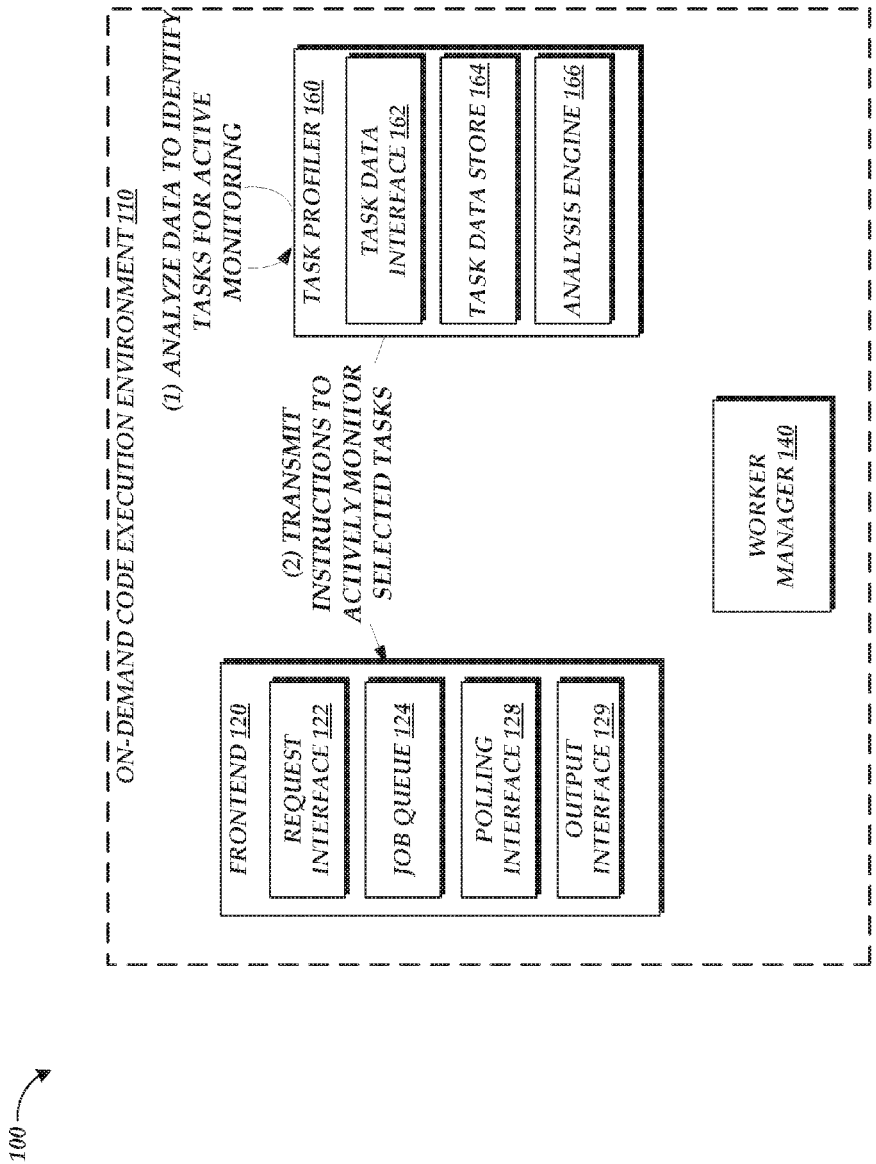

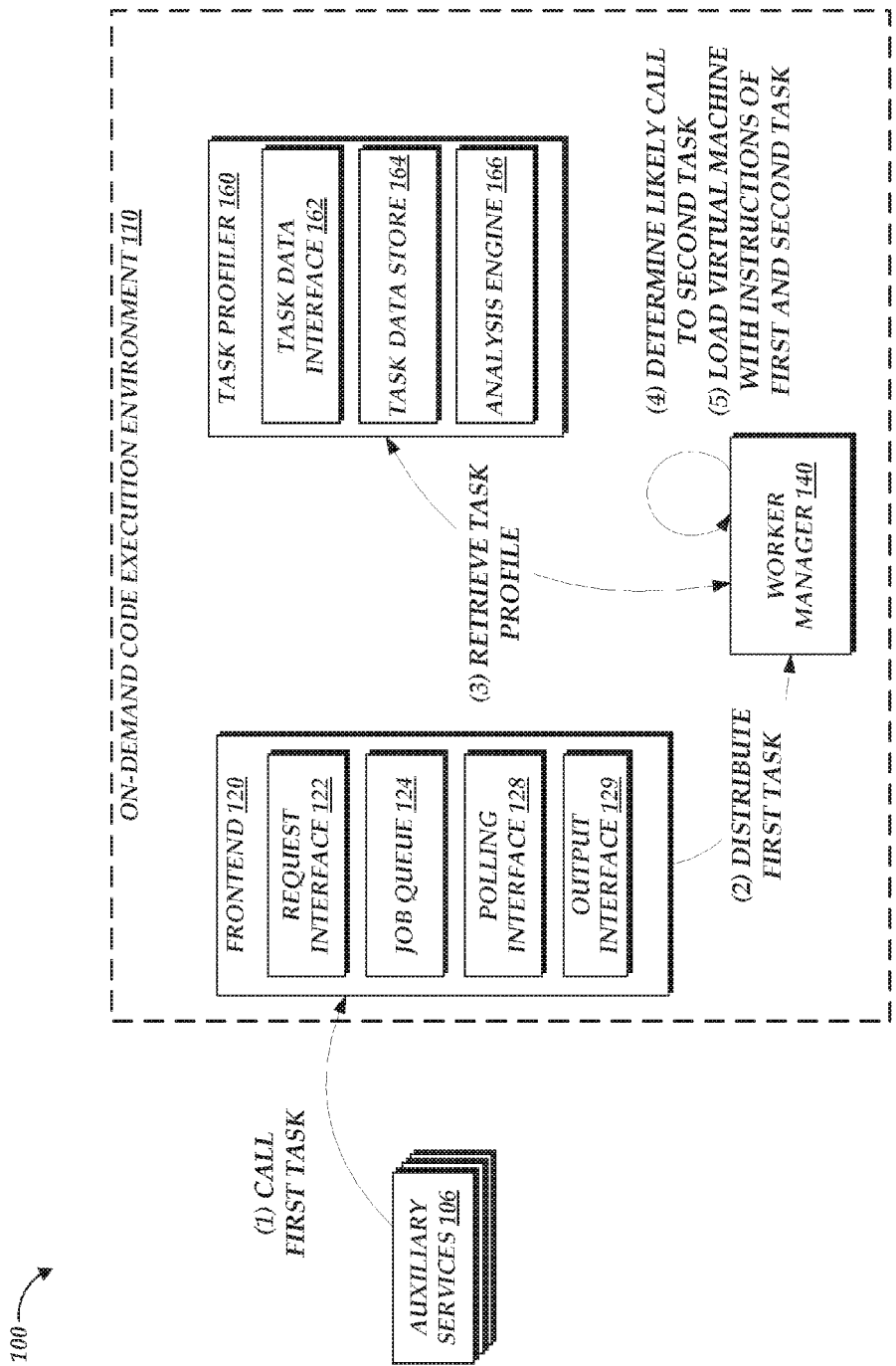

PREDICTIVE MANAGEMENT OF ON-DEMAND CODE EXECUTION

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF DRAWINGS

FIG. 4 is a flow diagram depicting illustrative interactions for analyzing passively gathered data within the on-demand code execution environment of FIG. 1 to determine a frequently executed tasks to mark those tasks for active monitoring;

FIGS. 8A and 8B are flow charts depicting illustrative interactions for handling execution of a second task predicted to occur based on an execution of a first task;

DETAILED DESCRIPTION

Figure 1:
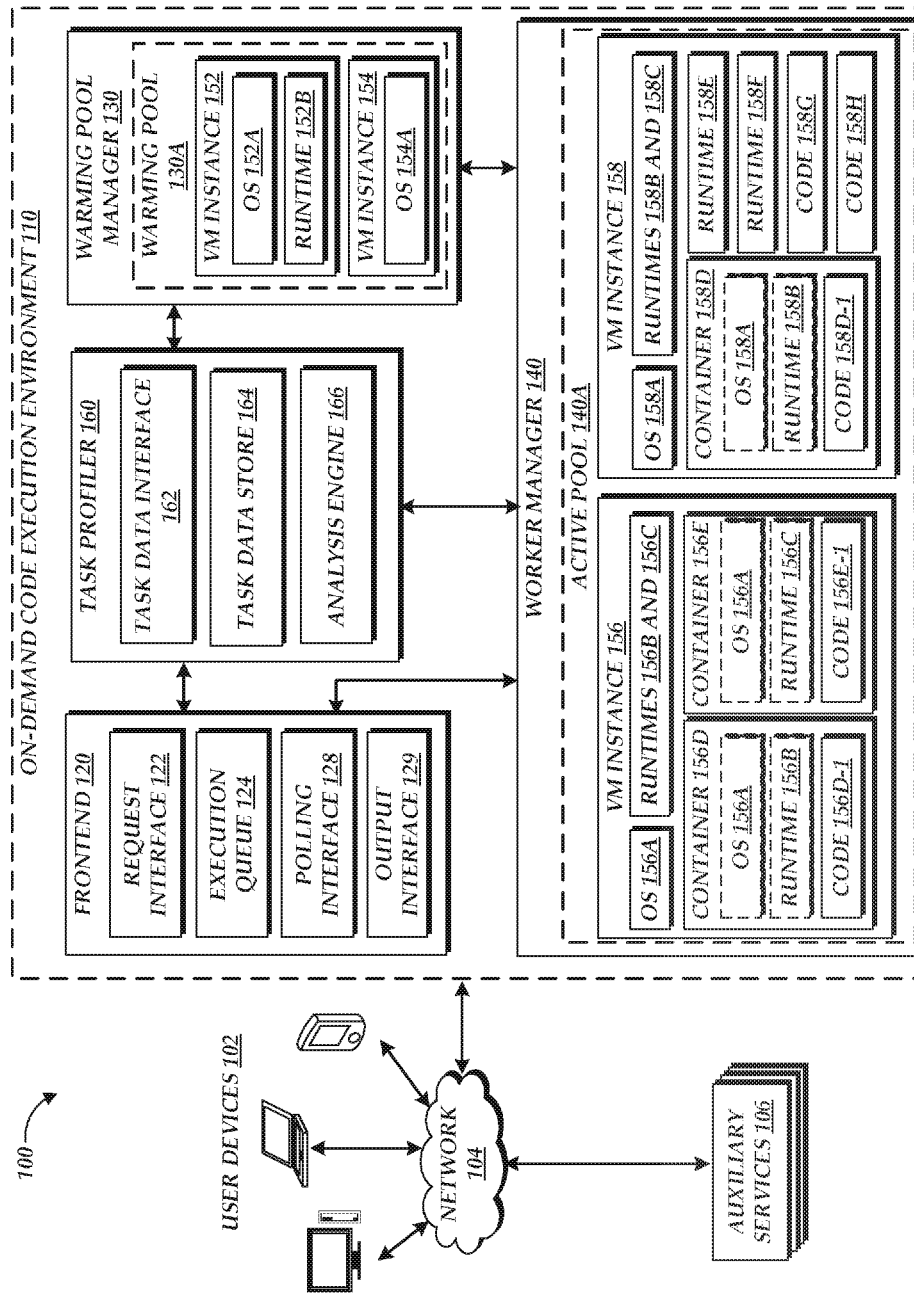
FIG. 1 is a block diagram depicting an illustrative environment in which an on-demand code execution environment can operate.

Generally described, aspects of the present disclosure relate to managing executions of tasks within a low latency, on-demand code execution environment, as well as the interactions of those executions within the on-demand code execution environment and with external services. The on-demand code execution environment may operate as part of a system of rapidly provisioned and released computing resources, often referred to as a "cloud computing environment." Specifically, the code execution environment may include one or more virtual machine instances that are "pre-warmed" (e.g., booted into an operating system and executing a complete or substantially complete runtime environment) and configured to enable execution of user-defined code, such that the code may be executed rapidly without initializing the virtual machine instance. Each set of code on the on-demand code execution environment may define a "task," and implement specific functionality corresponding to that task when executed on the on-demand code execution environment. Individual implementations of the task on the on-demand code execution environment may be referred to as an "execution" of the task. In some embodiments, executions of multiple "tasks" may be interrelated, such that a first task, when executed, triggers the execution of a second task, etc., until a complete set of desired functionality occurs. Moreover, tasks may be called for execution at the on-demand code execution environment by external services (such as database services, event parsing services, etc., each of which may be wholly or partially automated), and tasks may additionally or alternatively transmit calls to such external services. Thus, by utilizing tasks within the on-demand code execution environment, either alone or in conjunction with external services, complex functionality can be achieved. Beneficially, the division of this complex functionality into multiple constituent tasks or external service processes can create modularity, allowing individual tasks to be modified without effecting operation of other tasks. Moreover, dividing complex functionality into multiple constituent tasks or external service processes can increase the efficiency at which the functionality can be achieved, by distributing portions of the functionality to different devices and utilizing computing resources only when necessary. However, dividing complex functionality into multiple constituent tasks or external service processes may also make tracking of that functionality difficult, as no central entity may have knowledge of all tasks or external service processes. Thus, traditional debugging techniques, such as software profilers that monitor execution of a single program on a single computing device, are generally ineffective in monitoring execution of multiple tasks in an on-demand code execution environment. The present application addresses these issues and others by enabling executions of tasks within an on-demand code execution environment to be monitored (potentially in conjunction with external service processes), and enabling profiles of those executions to be generated for delivery to a user. As such, a user may be enabled to view or visualize the "paths" created by execution of tasks within the on-demand code execution environment, and thus more easily monitor, debug, or modify functionality implemented by interconnected tasks.

Moreover, the present application enables predictive handling of task calls based on a task profile. Specifically, the present application enables an on-demand code execution environment, on receiving a call to a first task, to determine whether a subsequent call (e.g., to an auxiliary service, to a second task, etc.) is likely to occur, and to modify operation of the on-demand code execution environment to facilitate that subsequent call. For example, where a call to a first task frequently results in a subsequent call to a second task, the on-demand code execution environment may, on receiving the call to the first task, load computer-executable instructions corresponding to both tasks within one or more virtual machines. As such, should the predicted call to the second task occur, that task may be executed on the pre-loaded virtual machines, minimizing time required to select a virtual machine for execution of the second task, and to load the code of the second task onto that virtual machine. As a further illustration, where execution of a first task frequently results in a call to an auxiliary service, a the on-demand code execution environment may select a virtual machine to execute the first task based on a communication path between the selected virtual machine and the auxiliary service. Illustratively, the on-demand code execution environment may select a virtual machine that is located nearby to the auxiliary service in terms of network distance (e.g., number of intermediary devices or "hops," latency, etc.) or may select a virtual machine that has a high quality network path to the auxiliary service (e.g., high bandwidth, pre-existing communication session, ability to utilize a preferred protocol, etc.). Should a call to the auxiliary service occur during execution of the first task, that call can be quickly routed to the auxiliary service via that communication path, increasing the ability of the on-demand code execution environment to quickly transmit auxiliary calls. Thus, the use of a profile can enable the on-demand code execution environment to predict subsequent calls based on an initial call, and to predictively prepare the on-demand code execution environment for the subsequent calls, such that those calls are handled in an efficient manner, should they occur.

As noted above, a profile may be utilized to determine interrelations between various calls or tasks on an on-demand code execution environment. By way of illustration, a user may attempt to utilize a combination of the on-demand code execution environment and external services in order to generate "thumbnail" images for a website or other network-based content. Illustratively, the user may configure a data storage service as a designated point for end users of the website to upload profile pictures or other images. The user may also configure the external data storage service, on successfully receiving and storing an image, to call a task on the on-demand code execution environment that retrieves the uploaded image from the data storage service, generates a smaller "thumbnail" version of the image, and places that smaller image back into the data storage service for use by the website. Assuming that each step of this process is implemented correctly, the process may successfully generate thumbnail images for each image uploaded to the website. However, if implemented incorrectly, this process could result in an "infinite loop," because each smaller image added to the data storage service may call a new execution of the task on the on-demand code execution environment, which places a yet smaller image into the data storage service, etc. Obviously, such a scenario is undesirable. However, because of the distributed and asynchronous nature of such a system, the user may have difficulty in diagnosing the problem. For example, while each individual component (e.g., the data storage service and the on-demand code execution environment) may provide logs to the user of its own activity, the user may be required to manually correlate those two activity logs in order to determine the cause of the error. While this example is somewhat simplified, such correlation becomes progressively more difficult as more diverse functionality is implemented across a variety of different systems.

To address these issues, the present application enables an on-demand code execution environment to monitor the execution of tasks on that environment, and to determine how such executions interrelate on the environment (e.g., to "trace" the execution of tasks within the on-demand code execution environment). Moreover, the present application enables the on-demand code execution environment to determine interactions between executions of tasks and external services (e.g., data storage services, event parsing services, etc.), and to generate a mapping or representation of those interactions. For example, the on-demand code execution environment may determine that a first external service called a first task, which called a second external service, which called a second task, etc. In some embodiments, this mapping or representation may be provided to a user, to ease monitoring, debugging, or modification of the tasks. For example, the on-demand code execution environment may generate a graph (such as a directed graph) that indicates the interconnections between executions of tasks on the on-demand code execution environment and/or external services, thereby enabling a user to visualize how multiple tasks or external services are used in conjunction to provide complex functionalities.

In one embodiment, monitoring of an execution may be facilitated by modifying a call to a task, to associate that call with a unique identifier. During and after execution of the task, subsequent related calls (e.g., to other tasks on the on-demand code execution environment or to auxiliary services) can also be associated with the same unique identifier. For example, the first time a task 'A' is called, the on-demand code execution environment may associate the call with the unique identifier 'ID-1', and store data indicating that the task 'A' was called, and assigned to unique identifier 'ID-1'. The on-demand code execution environment may further monitor execution of the task, and log any information pertaining to the execution (e.g., total execution time or results of execution). In addition, the on-demand code execution environment may modify any calls made during that execution of that task 'A', such that the unique identifier 'ID-1' is included within those calls. If the call triggers a subsequent execution of the task 'A' (or another task) on the on-demand code execution environment, the on-demand code execution environment may maintain the unique identifier for that subsequent call, and any other calls made in response to that subsequent call, while also logging data indicating each subsequent call and the associated unique identifier. Thereafter, the on-demand code execution environment may inspect the logged data to generate a list of calls associated with the unique identifier, the order in which the calls occurred, and any information pertaining to executions caused by those calls. Further, the on-demand code execution environment may process the logged data to visualize the relationships between the calls (e.g., a call to execute task 'A' caused a call to execute task 'B', which in turn caused a call to execute task 'C', etc.).

In another embodiment, monitoring of task executions may be facilitated by including historical information directly into calls to execute tasks on the on-demand code execution environment. For example, where a call to execute task 'A' results in a subsequent call to execute task 'B', the on-demand code execution environment may modify that subsequent call to include an indication that the source of the subsequent call was an execution of task 'A' occurring at a given point in time. This information may be propagated through subsequent, related calls to or from the on-demand code execution environment. For example, if a call to task 'B' was caused due to execution of task 'A' at a first point in time, and if the execution of task 'B' calls an execution of a task 'C', the call to task 'C' may be modified with historical information regarding the call (e.g., that the call was generated by the execution of task 'B' at a certain point in time, which was itself generated by the execution of task 'A' at a certain point in time, etc.). Illustratively, insertion of historical information into calls may enable the on-demand code execution environment to determine the history of any call very rapidly, without requiring analysis of log files. This may enable information regarding the task execution to be generated very rapidly (e.g., in real-time or otherwise without perceivable delay to an end user). However, if the amount of historical information grows large, insertion of this information into calls may delay or hinder processing of those calls. To ensure that historical information appended to or included within a call does not grow too large, the on-demand code execution environment may limit the historical information to a threshold size (e.g., the last n historical tasks that led to a specific call), and omit any historical information over that threshold size from subsequent calls.

In some instances, rather than maintaining a complete history within each call, the on-demand code execution environment may include within calls an abbreviated or compacted history, such as identifiers of each task called or executed prior to an individual call, as well as the number of times each task was called or executed (e.g., a given call was preceded by three executions of task 'A', two executions of task 'B', etc.). Use of abbreviated or compacted historical information may reduce the amount of data appended to or inserted into calls. In some instances, a unique ID may also be inserted into such calls, and the on-demand code execution environment may log, at each execution of a task, a time of the execution, the unique ID associated with the execution, and the abbreviated or compacted historical information corresponding to that execution. Thereafter, the on-demand code execution environment may utilize the logged data (e.g., the unique IDs, timestamps, and abbreviated or compacted historical information) to determine the interactions between various executions, and to generate a visualization of those interactions (e.g., in the form of a directed graph) for a user.

While the above-noted tracking techniques are discussed with respect to the on-demand code execution environment, some embodiments of the present disclosure may also utilize tracking information generated by auxiliary or external services. For example, where the on-demand code execution environment and an auxiliary service are owned or operated by a single entity, that entity may configure both the on-demand code execution environment and the external service to implement a consistent tracking scheme (e.g., such that both services respect and propagate unique identifiers within calls between the two services, such that both services insert historical information within the calls, etc.). Thus, the on-demand code execution environment may determine interactions not only between executions of tasks on the on-demand code execution environment, but also between those tasks and calls to external services.

It may in some cases be undesirable for the on-demand code execution environment to attempt to actively monitor all executions of all tasks on the on-demand code execution environment. As used herein, active monitoring generally refers to modifying execution of, or calls to or from, a task in order to generate monitoring data for that task. For example, active monitoring may include modifying task calls to include a unique identifier in that task call, or may include including historical information regarding past calls or executions into subsequent calls made from a task. In some instances, active monitoring may increase the time required to execute tasks on the on-demand code execution environment, which may be undesirable. Illustratively, the on-demand code execution environment may generally attempt to complete executions of tasks within a relatively low threshold time period, such as under 100 milliseconds (ms). Actively monitoring calls or executions on the on-demand code execution environment may introduce overhead to those executions, slowing their completion on the on-demand code execution environment (potentially above the threshold time period). Moreover, actively monitoring calls or executions may require increased computing resources on the on-demand code execution environment (e.g., to conduct analysis of log data to determine interactions between executions). Accordingly, the on-demand code execution environment may select to actively monitor calls or executions of only a subset of tasks. In one embodiment, these tasks may be designated by users of the on-demand code execution environment (e.g., by enabling a "debugging" preference for a specific task). In another embodiment, these tasks may be automatically selected by the on-demand code execution environment based on passive monitoring data. As used herein, passive monitoring generally refers to data collected during normal operations of the on-demand code execution environment, without modifying calls to or from, or executions of, a task. For example, the on-demand code execution environment may utilize passive monitoring data to identify those tasks that are executed frequently (e.g., more than a threshold number of times over a given time period), and mark those tasks for active monitoring. As a further example, the on-demand code execution environment may use passive monitoring information to identify tasks that satisfy other thresholds, such as specific levels of computing resources on the on-demand code execution environment (e.g., total execution time, processing power, network bandwidth, memory, etc.), and to mark those tasks for active monitoring.

Illustratively, the on-demand code execution environment may select actively monitored tasks based on pre-existing logging information available to the on-demand code execution environment, such that selection of actively monitored tasks does not alter normal operation of the on-demand code execution environment. For example, the on-demand code execution environment may be configured to log each execution of a task, timing information for that execution (e.g., time of execution start, duration, and/or completion), authorization information for that execution (e.g., the user or service that authorized execution), a source of that execution (e.g., the call, such as an application program interface ["API"], that caused execution or the source of that call), and outputs of that execution (e.g., calls made from the execution to execute other tasks or external services). Thereafter, the on-demand code execution environment may periodically (e.g., as a background process) analyze the log to determine frequently repeated information. For example, where a given task is frequently executed based on a specific call, from a specific source, and results in similar outputs (e.g., calls to the same external service), that task may be designated for active monitoring on the on-demand code execution environment. In some instances, rather than designating all executions of the task for active monitoring, the on-demand code execution environment may specify criteria for when executions of the task should be monitored (e.g., when they are caused by the specific call from the specific source). In one embodiment, all task information in a log may be analyzed to determine whether those tasks satisfy criteria for active monitoring. In other embodiments, a selection of task information from the log may be sampled to determine whether any tasks within the selection satisfy criteria for active monitoring. Thereafter, the on-demand code execution environment may implement active monitoring for the executions of the task and create a profile of the task, detailing interactions caused by the task. In one embodiment, the profile may include a visualization or other representation of the interactions, which can be presented to an end user (e.g., for debugging or optimization purposes).

In accordance with embodiments of the present disclosure, a task profile may also be utilized to predictively manage calls within an on-demand code execution environment. Specifically, the on-demand code execution environment can utilize the information within a profile of a given task to predict a likely subsequent call generated during execution of the task, and to prepare the on-demand code execution environment for that subsequent call, should it occur. For example, where the predicted subsequent call will cause execution of a second task on the on-demand code execution environment, the on-demand code execution environment can preemptively load executable code corresponding to the second task onto a virtual machine, such that should the predicted call to the second task occur, that second task can be executed quickly. The code of the second task may be loaded, for example, to an available virtual machine (e.g., within a "warming pool," such that that machine is capable of quickly executing the second task. In some instances, the code of the second task may be loaded onto the same virtual machine that is assigned to execute the initial task. Further, the virtual machine itself may be modified such that where execution of the initial task causes a call to the second task, that call need not be routed through other components of the on-demand code execution environment before returning to the virtual machine. For example, the virtual machine may be configured to intercept calls to the second task, and to directly execute the second task. As a further example, the code corresponding to the first and second tasks may be combined by the on-demand code execution environment, such that portions of code, initially corresponding to the first task, that generate a call to the second task are replaced with calls to other portions of the combined code that initially corresponded to the second code. Thus, no calls need be generated at all, and code of both the first and second tasks may be executed in combination. Accordingly, any overhead associated with generation of a call to the second task, assignment of that task to a virtual machine, loading of the virtual machine with requisite information, etc., can be greatly reduced by use of predictive call management based on task profiles.

As a further example, where a profile for a given task indicates that execution of that task will likely result in a call to an auxiliary service, the on-demand code execution environment may select a virtual machine to execute the task based on available communication paths between the selected virtual machine and the auxiliary service, potentially increasing the speed and reliability of transmission of the call to the auxiliary service. For example, where the on-demand code execution environment has access to virtual machines executed on host computing devices in a variety of geographical locations, the on-demand code execution environment may select a virtual machine instance that is physically proximate to the geographical location of the auxiliary service. Geographic locations of virtual machine instances (or hosts executing virtual machine instances) and/or of auxiliary services may be determined, for example, by manual data entry or use of a geographic information system (GIS), which correlates network addresses, such as Internet Protocol (IP) addresses, to geographic locations. Utilization of a GIS may in some instances be referred to as "IP geo-location." As a further example, where the on-demand code execution environment has access to virtual machines with different network connectivities (e.g., access to different networks different network locations, different communication capabilities, etc.), the on-demand code execution environment may select a virtual machine instance based on its proximity (e.g., in terms of network distance) to the auxiliary service, or based on a quality of communication path between the selected virtual machine and the auxiliary service (which may reflect or include network distance, bandwidth, reliability, or other network path metrics). In some instances, the on-demand code execution environment may maintain one or more virtual machines that are preferred connection points for a given auxiliary service. These virtual machines may, for example, maintain a set of persistent connections to the auxiliary service, such that overhead related to initializing a connection to the auxiliary service is reduced or eliminated. In some instances, these virtual machines may utilize alternative or specialized communications protocols to communicate with the auxiliary service than would otherwise be used by the on-demand code execution environment, which protocols enable quicker or more reliable communication between the virtual machines and the auxiliary service. Thus, utilization of a task profile can enable the on-demand code execution environment to select a virtual machine to execute a first task, such that when a predicted call to an auxiliary service occurs, that call can be transmitted quickly and reliably.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The execution of tasks on the on-demand code execution environment will now be discussed. Specifically, to execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user, which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identify a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. patent application Ser. No. 14/502,648, entitled "PROGRAMMATIC EVENT DETECTION AND MESSAGE GENERATION FOR REQUESTS TO EXECUTE PROGRAM CODE" and filed Sep. 30, 2014 ("the '648 Application), the entirety of which is hereby incorporated by reference.

The foregoing aspects and many of the attendant advantages of this disclosure will become more readily appreciated as the same become better understood by reference to the following detailed description, when taken in conjunction with the accompanying drawings.

FIG. 1 is a block diagram of an illustrative operating environment 100 in which an on-demand code execution environment 110 may operate based on communication with user computing devices 102 and auxiliary services 106. By way of illustration, various example user computing devices 102 are shown in communication with the on-demand code execution environment 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution environment 110 may provide the user computing devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the on-demand code execution environment 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate with the one-demand code execution environment 110. For example, the auxiliary services 106 can include web services (e.g., associated with the user computing devices 102, with the on-demand code execution environment 110, or with third parties), data bases, really simple syndication ("RSS") readers, social networking sites, or any other source of network-accessible service or data source. In some instances, auxiliary services 106 may be associated with the on-demand code execution environment, e.g., to provide billing or logging services to the on-demand code execution environment. In some instances, auxiliary services 106 actively transmit information, such as API calls or other task-triggering information, to the on-demand code execution environment 110. In other instances, auxiliary services 106 may be passive, such that data is made available for access by the on-demand code execution environment 110. As described below, components of the on-demand code execution environment 110 may periodically poll such passive data sources, and trigger tasks within the on-demand code execution environment 110 based on the data provided. While depicted in FIG. 1 as distinct from the user computing devices 102 and the on-demand code execution environment 110, in some embodiments, various auxiliary services 106 may be implemented by either the user computing devices 102 or the on-demand code execution environment 110.

The user computing devices 102 and auxiliary services 106 may communication with the on-demand code execution environment 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution environment 110 is depicted in FIG. 1 as operating in a distributed computing environment including several computer systems that are interconnected using one or more computer networks (not shown in FIG. 1). The on-demand code execution environment 110 could also operate within a computing environment having a fewer or greater number of devices than are illustrated in FIG. 1. Thus, the depiction of the on-demand code execution environment 110 in FIG. 1 should be taken as illustrative and not limiting to the present disclosure. For example, the on-demand code execution environment 110 or various constituents thereof could implement various Web services components, hosted or "cloud" computing environments, and/or peer to peer network configurations to implement at least a portion of the processes described herein.

Further, the on-demand code execution environment 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the example of FIG. 1, the on-demand code execution environment 110 is illustrated as connected to the network 104. In some embodiments, any of the components within the on-demand code execution environment 110 can communicate with other components of the on-demand code execution environment 100 via the network 104. In other embodiments, not all components of the on-demand code execution environment 110 are capable of communicating with other components of the virtual environment 100. In one example, only the frontend 120 may be connected to the network 104, and other components of the on-demand code execution environment 110 may communicate with other components of the virtual environment 100 via the frontend 120.

In FIG. 1, users, by way of user computing devices 102, may interact with the on-demand code execution environment 110 to provide executable code, and establish rules or logic defining when and how such code should be executed on the on-demand code execution environment 110. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution environment 110, and request that the on-demand code execution environment 110 execute the code using one or more pre-established virtual machine instances. The on-demand code execution environment 110 can handle the acquisition and configuration of compute capacity (e.g., containers, instances, etc., which are described in greater detail below) based on the code execution request, and execute the code using the compute capacity. The on-demand code execution environment 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution environment 110, the environment 110 includes a frontend 120, which enables interaction with the on-demand code execution environment 110. In an illustrative embodiment, the frontend 120 serves as a "front door" to the other services provided by the on-demand code execution environment 110, enabling users (via user computing devices 102) to provide, request execution of, and view results of computer executable code. As shown in FIG. 1, the frontend 120 includes a variety of components to enable interaction between the on-demand code execution environment 110 and other computing devices. Specifically, the frontend 120 includes a request interface 122, a job queue 124, a distribution manager 126, a polling interface 128, and an output interface 129. The request interface 122 may provide user computing devices 102 with the ability to upload or otherwise communication user-specified code to the on-demand code execution environment 110, and to thereafter request execution of that code. In one embodiment, the request interfaces 122 communicates with external computing devices (e.g., user computing devices 102, auxiliary services 106, etc.) via a graphical user interface (GUI), CLI, or API. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Requests to execute a task may generally be referred to as "calls" to that task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution environment 110) prior to the request being received by the on-demand code execution environment 110. The on-demand code execution environment 110 may vary its execution strategy for a task based on where the code of the task is available at the time a call for the task is processed.

The request interface 122 may receive calls to execute tasks in response to Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution environment 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution environment 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution environment 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution environment 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution environment 110 may inspect the call and look for the flag or the header, and if it is present, the on-demand code execution environment 110 may modify the behavior (e.g., logging facilities) of the container in which the task is executed, and cause the output data to be provided back to the user. In some embodiments, the behavior/mode indicators are added to the call by the user interface provided to the user by the on-demand code execution environment 110. Other features such as source code profiling, remote debugging, etc. may also be enabled or disabled based on the indication provided in a call.

To manage requests for code execution, the frontend 120 further includes an execution queue 124, which can maintain a record of user-requested task executions. Illustratively, the number of simultaneous task executions by the on-demand code execution environment 110 is limited, and as such, new task executions initiated at the on-demand code execution environment 110 (e.g., via an API call) may be placed on the execution queue 124 and processed, e.g., in a first-in-first-out order. In some embodiments, the on-demand code execution environment 110 may include multiple execution queues 124, such as individual execution queues 124 for each user account. For example, users of the on-demand code execution environment 110 may desire to limit the rate of task executions on the on-demand code execution environment 110 (e.g., for cost reasons). Thus, the on-demand code execution environment 110 may utilize an account-specific execution queue 124 to throttle the rate of simultaneous task executions by a specific user account. In some instances, the on-demand code execution environment 110 may prioritize task executions, such that task executions of specific accounts or of specified priorities bypass or are prioritized within the execution queue 124. In other instances, the on-demand code execution environment 110 may execute tasks immediately or substantially immediately after receiving a call for that task, and thus, the execution queue 124 may be omitted.

As noted above, tasks may executed at the on-demand code execution environment 110 based on explicit calls from user computing devices 102 (e.g., as received at the request interface 120). Alternatively or additionally, tasks may be executed at the on-demand code execution environment 110 based on data retrieved from one or more auxiliary services 106. To facilitate interaction with auxiliary services 106, the frontend 120 can include a polling interface 128, which operates to poll auxiliary services 106 for data. Illustratively, the polling interface 128 may periodically transmit a request to one or more user-specified auxiliary services 106 to retrieve any newly available data (e.g., social network "posts," news articles, etc.), and to determine whether that data corresponds to a user-established trigger to execute a task on the on-demand code execution environment 110. Illustratively, each trigger may specify one or more criteria for execution of a task, including but not limited to whether new data is available at the auxiliary services 106, the type or content of the data, or timing information corresponding to the data.

In addition to tasks executed based on explicit user calls and data from auxiliary services 106, the on-demand code execution environment 110 may in some instances operate to execute tasks independently. For example, the on-demand code execution environment 110 may operate (based on instructions from a user) to execute a task at each of a number of specified time intervals (e.g., every 10 minutes).

The frontend 120 further includes an output interface 129 configured to output information regarding the execution of tasks on the on-demand code execution environment 110. Illustratively, the output interface 129 may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface 129 may further enable transmission of data, such as service calls, to auxiliary services 106. For example, the output interface 129 may be utilized during execution of a task to transmit an API request to an external service 106 (e.g., to store data generated during execution of the task).

To execute tasks, the on-demand code execution environment 110 includes a warming pool manager 130, which "pre-warms" (e.g., initializes) virtual machine instances to enable tasks to be executed quickly, without the delay caused by initialization of the virtual machines. The on-demand code execution environment 110 further includes a worker manager 140, which manages active virtual machine instances (e.g., currently assigned to execute tasks in response to task calls).

The warming pool manager 130 ensures that virtual machine instances are ready to be used by the worker manager 140 when the on-demand code execution environment 110 receives a call to execute a task on the on-demand code execution environment 110. In the example illustrated in FIG. 1, the warming pool manager 130 manages the warming pool 130A, which is a group (sometimes referred to as a pool) of pre-initialized and pre-configured virtual machine instances that may be used to service incoming task execution calls. In some embodiments, the warming pool manager 130 causes virtual machine instances to be booted up on one or more physical computing machines within the on-demand code execution environment 110 and added to the warming pool 130A. For example, the warming pool manager 130 may cause additional instances to be added to the warming pool 130A based on the available capacity in the warming pool 130A to service incoming calls. In some embodiments, the warming pool manager 130 may utilize both physical computing devices within the on-demand code execution environment 110 and one or more virtual machine instance services to acquire and maintain compute capacity that can be used to service calls received by the frontend 120. In some embodiments, the on-demand code execution environment 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific call to execute a task. The predetermined set of configurations can correspond to various types of virtual machine instances to execute tasks. The warming pool manager 130 can optimize types and numbers of virtual machine instances in the warming pool 130A based on one or more metrics related to current or previous task executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's calls. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the call to execute a task on the on-demand code execution environment 110. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task's call via a user interface provided by the on-demand code execution environment 110, the user interface may prompt the user to specify one of the predetermined operating conditions for executing the task. In another example, the service-level agreement (SLA) for utilizing the services provided by the on-demand code execution environment 110 may specify a set of conditions (e.g., programming languages, computing resources, etc.) that calls should satisfy, and the on-demand code execution environment 110 may assume that the calls satisfy the set of conditions in handling the requests. In another example, operating conditions specified in the call may include: the amount of compute power to be used for executing the task specified in the call; the type of the request (e.g., HTTP vs. a triggered event); the timeout for the task (e.g., threshold time after which an execution of the task may be terminated); and security policies (e.g., may control which instances in the warming pool 130A are usable by which user), among other specified conditions.

The worker manager 140 manages the instances used for servicing incoming calls to execute tasks. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution environment 110). In some embodiments, the requests associated with the same user group may share the same containers (e.g., if the user codes associated therewith are identical). In some embodiments, a call does not differentiate between the different users of the group and simply indicates the group to which the users associated with the call belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, tasks are executed in isolated on-demand code execution environments referred to as containers (e.g., containers 156D, 156E, 158D). Containers are logical units created within a virtual machine instance using the resources available on that instance. For example, the worker manager 140 may, based on information specified in a call to execute a task, create a new container or locate an existing container in one of the instances in the active pool 140A and assigns the container to the call to handle the execution of the task. In one embodiment, such containers are implemented as Linux containers.

Once a call has been successfully processed by the frontend 120, the worker manager 140 finds capacity to service the call to execute a task on the on-demand code execution environment 110. For example, if there exists a particular virtual machine instance in the active pool 140A that has a container with the user code of the task already loaded therein (e.g., code 156D-1 shown in the container 156D), the worker manager 140 may assign the container to the call and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the call, and cause the used code to be loaded and executed in the container.

If the worker manager 140 determines that the user code associated with the called task is not found on any of the instances (e.g., either in a container or the local cache of an instance) in the active pool 140A, the worker manager 140 may determine whether any of the instances in the active pool 140A is currently assigned to the user associated with the call and has compute capacity to handle the call. If there is such an instance, the worker manager 140 may create a new container on the instance and assign the container to execute the task specified in the call. Alternatively, the worker manager 140 may further configure an existing container on the instance assigned to the user, and assign the container to the call. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the call, creates a new container on the instance, assigns the container to the call, and causes the user code of the task to be downloaded and executed on the container.

In some embodiments, the on-demand code execution environment 110 is adapted to begin execution of a task shortly after it is received (e.g., by the frontend 120). A time period can be determined as the difference in time between initiating execution of the task (e.g., in a container on a virtual machine instance associated with the user) and receiving a call to execute the task (e.g., received by a frontend). The on-demand code execution environment 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution environment 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the call at the time the call is received.

Once the worker manager 140 locates one of the virtual machine instances in the warming pool 130A that can be used to serve the call, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service calls of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution environment 110 may maintain a separate cache in which code of tasks are stored to serve as an intermediate level of caching system between the local cache of the virtual machine instances and a web-based network storage (e.g., not shown in FIG. 1). The various scenarios that the worker manager 140 may encounter in servicing the call are described in greater detail within the '648 application, incorporated by reference above (e.g., at FIG. 4 of the '648 application).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average call volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution environment 110 may provide data to one or more of the auxiliary services 106 as it services incoming calls. For example, the frontend 120 may communicate with the monitoring/logging/billing services included within the auxiliary services 106. The monitoring/logging/billing services may include: a monitoring service for managing monitoring information received from the on-demand code execution environment 110, such as statuses of containers and instances on the on-demand code execution environment 110; a logging service for managing logging information received from the on-demand code execution environment 110, such as activities performed by containers and instances on the on-demand code execution environment 110; and a billing service for generating billing information associated with executing user code on the on-demand code execution environment 110 (e.g., based on the monitoring information and/or the logging information managed by the monitoring service and the logging service). In addition to the system-level activities that may be performed by the monitoring/logging/billing services (e.g., on behalf of the on-demand code execution environment 110), the monitoring/logging/billing services may provide application-level services on behalf of the tasks executed on the on-demand code execution environment 110. For example, the monitoring/logging/billing services may monitor and/or log various inputs, outputs, or other data and parameters on behalf of the tasks being executed on the on-demand code execution environment 110.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The worker manager 140 may include an instance allocation unit for finding compute capacity (e.g., containers) to service incoming code execution requests and a user code execution unit for facilitating the execution of user codes on those containers. An example configuration of the worker manager 140 is described in greater detail within the '648 application, incorporated by reference above (e.g., within FIG. 2 of the '648 application).

In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the on-demand code execution environment 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the on-demand code execution environment 110 may comprise multiple frontends, multiple warming pool managers, and/or multiple worker managers. Although four virtual machine instances are shown in the example of FIG. 1, the embodiments described herein are not limited as such, and one skilled in the art will appreciate that the on-demand code execution environment 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the on-demand code execution environment 110 may comprise any number of warming pools and active pools.

In accordance with embodiments of the present disclosure, the on-demand code execution environment 110 further includes a task profiler 160, which includes components enabling profiles to be created for individual tasks executed on the on-demand code execution environment, which profiles indicate the interactions occurring based on the execution of a task (e.g., which calls to the on-demand code execution environment 110 or to auxiliary services 106 were made by an execution of the task, any subsequent calls caused by those initial calls, details regarding those calls, etc.). As will be described below, these task profiles may allow a user to monitor the "path" of executions on the on-demand code execution environment 110 and/or on various auxiliary services 106. For example, a task profile for 'task A' may indicate that an execution of task A called an execution of 'task B', which called an execution of 'task C', etc. As a further example, a task profile for 'task A' may indicate that an execution of task A called 'auxiliary service X', which called an execution of task B, which again called auxiliary service X, etc. As such, a task profile can provide a user with detailed information regarding how executions of tasks on the on-demand code execution environment 110 are interrelated.

To enable interaction between the task profiler 160 and the on-demand code execution environment 110, the task profiler 160 includes a task data interface 162, which interacts with the frontend 120 of the on-demand code execution environment 110 to receive task data and profile task profiles, among other information. For example, data may be received from the request interface 122 to indicate that a call (e.g., an API call) has been received at the frontend 120 requesting execution of a task on the on-demand code execution environment, or that an execution of a task transmitted a call to an auxiliary service 106.

The task profiler 160 further includes a task data store 164 to store the received task data and/or task profiles generated based on the task data. The task data store 164 may correspond to any persistent or substantially persistent data storage, such as a hard drive (HDD), a solid state drive (SDD), network attached storage (NAS), a tape drive, or any combination thereof.

The task profiler 160 further includes an analysis engine 166 configured to read data from the task data store 164, and generate task profiles based on that data. In one embodiment, generation of a task profile may include gathering data regarding individual executions of that task, and determining what other task executions or external service functionalities are related to that individual execution. For example, the analysis engine 166 may monitor task executions or calls that precipitated the individual execution (e.g., that the individual execution was caused by a call from a first auxiliary service, which was caused by a call from an additional task, etc.), as well as task execution or calls that follow the individual execution (e.g., the individual execution called an additional task, which when executed called an external service). In one embodiment, prior or subsequent calls or executions related to an individual task execution may be determined based on a unique identifier associated with each of the calls or executions. For example, the analysis engine 166 may determine that any record of calls or executions associated with a given unique identifier are interrelated, and generate a profile (such as a map or graph) detailing those interrelations (e.g., based on the tasks or auxiliary services called and the timestamp at which the call was made). In another embodiment, prior or subsequent calls or executions related to an individual task execution may be determined based on historical information embedded within calls themselves. For example, a call to execute a task 'B' may indicate that it was caused by a prior execution of task 'A', which was called by an external service, etc. This information may serve as at least a partial record of calls prior to the execution of task 'B'. The analysis engine 166 may further determine that the executed task 'B' called a task 'C' at a specific time, and inspect the log for information regarding that execution of task 'C' (including, e.g., what calls the execution of task 'C' made). The analysis engine 166 may repetitively inspect log information in this manner to determine subsequent calls made from a given task execution. In some instances, the analysis engine 166 may gather this information simultaneously to the chain of task executions itself, such that a user may view, in real-time, a profile detailing how a series of task executions on the on-demand code execution environment 110 are interrelated. While profiles are discussed above with respect to individual task executions, in some embodiments the analysis engine 166 may generate statistical information regarding multiple executions of a task. For example, the analysis engine 166 may compile profile information regarding multiple executions of a task, and determine the probabilities that an execution of a task was caused by a multitude of potential calls, the probabilities that an execution of the task results in a call to other tasks or auxiliary service, etc. In one embodiment, the analysis engine 166 may monitor all executions of a task occurring on the on-demand code execution environment 110. In another embodiment, the analysis engine 166 may monitor a sample (e.g., a subset selected according to selection criteria, which may include random sampling) of executions of the task.

In addition to generating information regarding how task executions (or calls to those executions) are interrelated, the analysis engine 166 may also function to select specific tasks for monitoring. As noted above, it may be infeasible or undesirable for the on-demand code execution environment 110 to conduct active monitoring of all executions of all tasks, and to generate data needed to generate a profile of those tasks (e.g., by inserting monitoring information into calls to or from those tasks). Thus, the analysis engine 166 may select specific tasks that, when executed, are subject to active monitoring by the on-demand code execution environment 110. In one embodiment, the analysis engine 166 may select tasks based on the task's execution frequency (e.g., how often the task is executed on the on-demand code execution environment 110). In another embodiment, the analysis engine 166 may select tasks based on a frequency of specific types of task execution, such as how often the task is executed based on a specific call (e.g., from a specific auxiliary service, from another specific task, etc.), how often the task, when executed, makes a specific call, or a combination thereof. In this manner, the analysis engine 166 may function to identify "hot paths" within the on-demand code execution environment 110 (e.g., a specific pattern of calls and executions that occurs frequently relative to other patterns of calls and executions). Tasks that occur as part of a "hot path" may be marked for subsequent monitoring, such that when called on the on-demand code execution environment 110, additional logging information regarding the calls and executions of that task are generated at the on-demand code execution environment 110, in accordance with embodiments of the present disclosure.

While operation of the analysis engine 166 is described herein with respect to the task data store 164, in some embodiments the analysis engine 166 may further operate in real-time or substantially real-time based on task data received at the task profiler 160. For example, the analysis engine 166 may analyze individual items of task data received at the task profiler 160 to determine whether that task data (e.g., individually or in conjunction with the task data stored in the task data store 164) should be included in a profile provided to a user. While the task profiler 160 is shown in FIG. 1 as included within the on-demand code execution environment 110, embodiments of the present disclosure may include a task profiler 160 that is operated separately from the on-demand code execution environment 110, and which communicates with the on-demand code execution environment 110 and/or with auxiliary services 106 to receive task call and execution information, as described herein.

While not shown in FIG. 1, in some embodiments, the on-demand code execution environment 110 may include multiple frontends 120. In such embodiments, a load balancer may be provided to distribute the incoming calls to the multiple frontends 120, for example, in a round-robin fashion. In some embodiments, the manner in which the load balancer distributes incoming calls to the multiple frontends 120 may be based on the state of the warming pool 130A and/or the active pool 140A. For example, if the capacity in the warming pool 130A is deemed to be sufficient, the calls may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the calls may be distributed to the multiple frontends 120 in a manner that reduces or minimizes the number of virtual machine instances taken from the warming pool 130A. For example, even if, according to a load balancing restriction, a call is to be routed to Frontend A, if Frontend A needs to take an instance out of the warming pool 130A to service the call but Frontend B can use one of the instances in its active pool to service the same call, the call may be routed to Frontend B.

Figure 2:
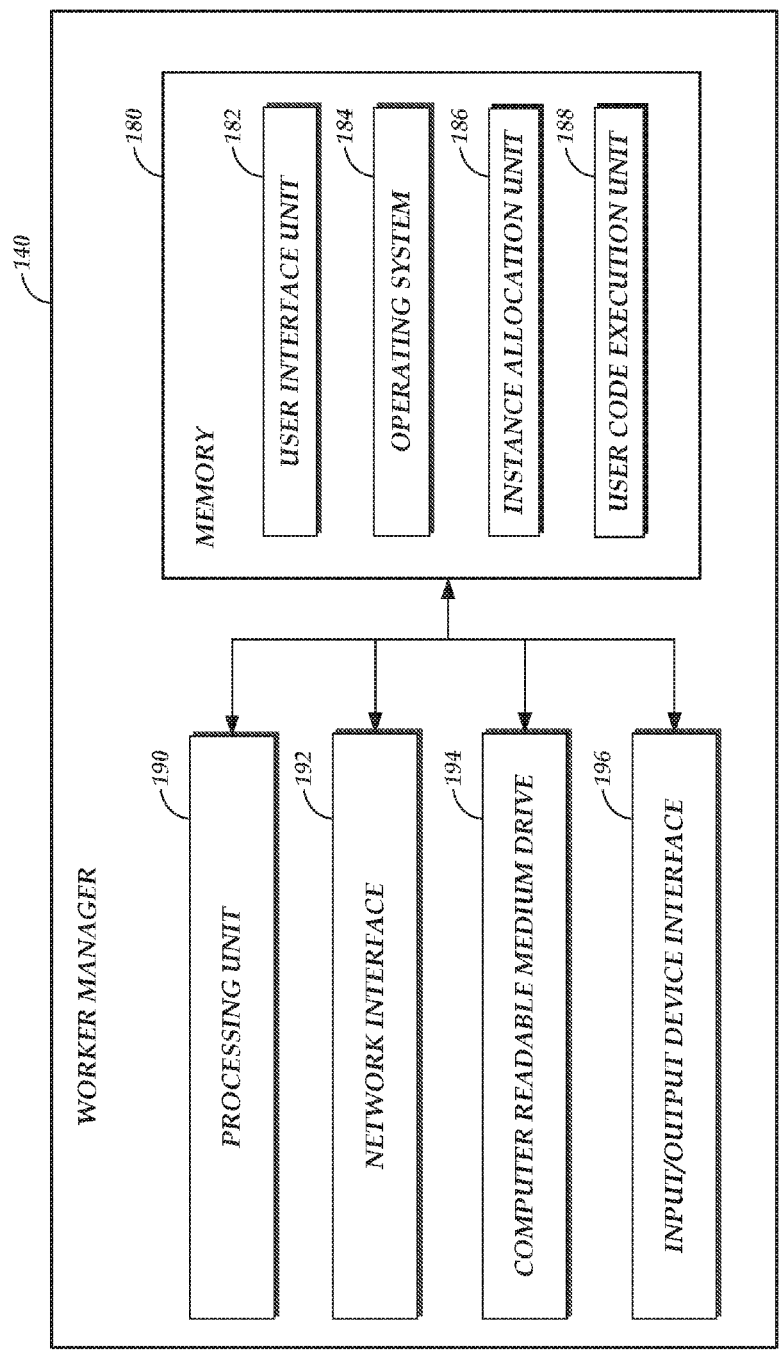
FIG. 2 depicts a general architecture of a computing device providing an on-demand code execution environment manager for implementing low latency on-demand code execution.

FIG. 2 depicts a general architecture of a computing system (referenced as worker manager 140) that manages the virtual machine instances in the on-demand code execution environment 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a call to execute a task. For example, the instance allocation unit 186 identifies a virtual machine instance and/or a container that satisfies any constraints specified by the call and assigns the identified virtual machine instance and/or container to the user or the call itself. The instance allocation unit 186 may perform such identification based on the programming language in which the user code corresponding to the task is written. For example, if the user code is written in Python, and the instance allocation unit 186 may find a virtual machine instance (e.g., in the warming pool 130A of FIG. 1) having the Python runtime pre-loaded thereon and assign the virtual machine instance to the user. In another example, if the program code specified in the call of the user is already loaded on an existing container or on another virtual machine instance assigned to the user (e.g., in the active pool 140A of FIG. 1), the instance allocation unit 186 may cause the call to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the call.

The user code execution unit 188 manages the execution of the program code corresponding to the task specified by the call of the user once a particular virtual machine instance has been assigned to the user associated with the call and a container on the particular virtual machine instance has been assigned to the call. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution environment 110 and/or another computing device. For example, in certain embodiments of the present disclosure, another computing device in communication with the on-demand code execution environment 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

While the computing device of FIG. 2 is described as implementing a worker manager, the same or a similar computing device may additionally or alternatively be utilized to implement other components of the on-demand code execution environment 110. For example, such a computing device may be utilized, independently or in conjunction with other components (e.g., data stores) to implement the task profiler 160 of FIG. 1. The software or computer-executable instructions placed within the memory 180 may be modified to enable execution of the functions described herein with respect to the task profiler 160. For example, computer-executable instructions may be placed within the memory that configure the computing device to execute the routine 600 of FIG. 6, described in more detail below.

Figure 3:
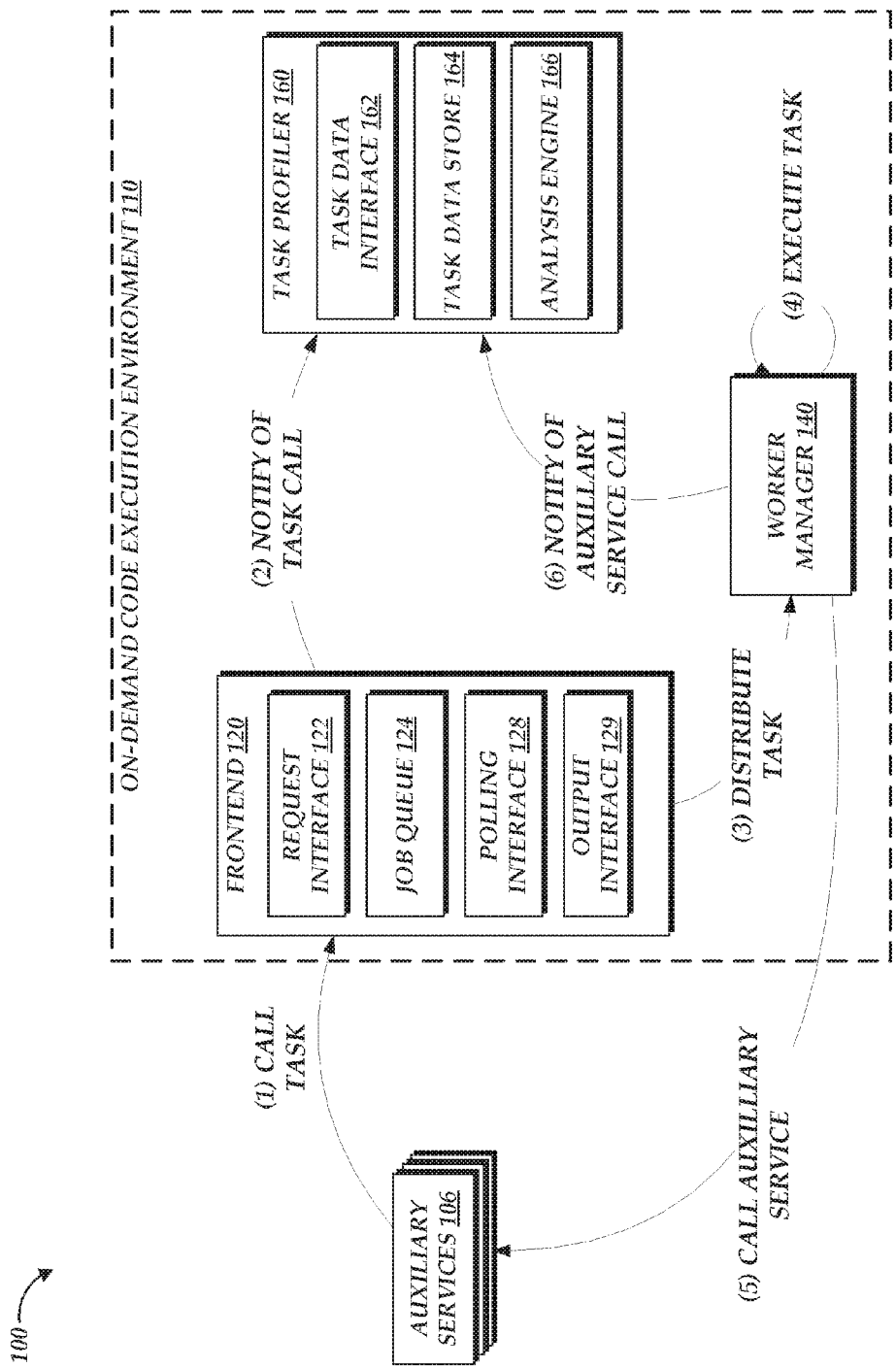
FIG. 3 is a flow diagram depicting illustrative interactions for passively monitoring calls made to and from the on-demand code execution environment of FIG. 1, which may generate data utilized to determine frequently executed tasks in the on-demand code execution environment.

With reference to FIG. 3, illustrative interactions are depicted for generating passive monitoring data regarding execution of tasks on the on-demand code execution environment 110. As discussed above, this passive monitoring data may be utilized by the task profiler 160 to identify tasks (or specific executions of those tasks) for active monitoring. The data from such active monitoring may then be used to generate a profiler for a task, which may aid a user in visualizing the "path" of executions on the on-demand code execution environment 110 that precipitated or stemmed from a task, as well as in debugging or optimizing that path of executions.

The interactions of FIG. 3 begin at (1), where an auxiliary services 106 transmits a call to the frontend 120 of the on-demand code execution environment 110 to execute a task. In one embodiment, interaction (1) may include transmission of an API call from the auxiliary services 106 to the frontend 120. In another embodiment, interaction (1) may include transmission of data to the frontend 120 (e.g., in response to a request for the data initiated by the polling interface 128) that indicates that execution of a task should occur (e.g., the posting of a new message to a social networking service, the uploading of a file, etc.).

Thereafter, at (2), the frontend 120 transmits data of the task profiler 160 indicating that a call to a specific task has been received. The data may include any information related to the call, including but not limited to the time at which the call occurred, the identity of the auxiliary services 106 making the call, the credentials or authorization data provided by the auxiliary services 106, the specific task being called, the parameters for the task specified in the call (e.g., function parameters to be provided by user code when executing the call). In some embodiments, the data may include a verbatim record of the call itself. The task profiler 160 may store the received task data within the task data store 164.

At (3), the frontend 120 can distribute the task to the worker manager 140 for execution. The work manager 140, in turn, can select a virtual machine instance (not shown in FIG. 3) to handle the task, and cause the virtual machine instance to execute user code corresponding to the task, at (4). Further details regarding distribution and execution of user code are provided within the '648 Application, incorporated by reference above (e.g., at FIG. 4 of the '648 application).

At (5), the worker manager 140 (which may include virtual machine instances executed by the worker manager 140) transmits a call to an auxiliary service 106. Illustratively, the call may be transmitted based on execution of user code on the worker manager 140 (e.g., based on an API call to the auxiliary service 106 made during execution of the user code) which instructs a virtual machine instance to generate and transmit an API call or an HTTP packet to the auxiliary service 106. In addition, at (6), the worker manager (e.g., a virtual machine instance executed by the worker manager 140) notifies the task profiler 160 of the auxiliary service call. In one embodiment, the notification is transmitted by the worker manager 140 by modifying the user code corresponding to the distributed task, such that when execution of that code would cause transmission of a call to the auxiliary service 106, a notification is also transmitted to the task profiler 160. In another embodiment, the notification is transmitted by the worker manager 140 by monitoring, at the worker manager 140, execution of the user code corresponding to the task, and generating (e.g., via a separate process than the task execution) the notification to the task profiler 160. The notification may include any data regarding the auxiliary service call, including but not limited to the timing of the call, the identity of the task making the call, the credentials or authorization data provided by the task, the specific auxiliary service 106 being called, the parameters for the auxiliary service 106 specified in the call (e.g., function parameters or data to be provided to the auxiliary service 106 via the call). In some embodiments, the data may include a verbatim record of the call itself. The task profiler 160 may store the received task data within the task data store 164. The interactions of FIG. 3 may then end.

One of skill in the art will appreciate that the additional or alternative interactions to those describe in FIG. 3 may also occur within the on-demand code execution environment 110. For example, the interactions described in FIG. 3 may be repeated multiple times, sequentially, in parallel, or both, to enable execution of tasks on the on-demand code execution environment 110. In some instances, the on-demand code execution environment 110 may be configured to process thousands or millions of calls and task executions simultaneously. Thus, the depictions of FIG. 3 (discussing the processing of a single task call) may represent only a tiny fraction of operations occurring on the on-demand code execution environment 110. Moreover, the specific interactions of FIG. 3 may vary. For example, while the task call of FIG. 3 is described as transmitted by an auxiliary service 106, such task calls may additionally or alternatively be transmitted by a user computing device 102. Moreover, such task calls may be transmitted by the on-demand code execution environment 110 itself. Illustratively, a first task executing on the on-demand code execution environment 110 may transmit a call to a second task, which when executed may transmit a call to a third task, etc. In addition, while some interactions of FIG. 3 are described with respect to transmission of notifications to the task profiler 160, embodiments of the present disclosure can also include retrieval of information by the task profiler 160. For example, rather than obtaining notifications of task calls and/or auxiliary service calls, the task profiler 160 may be configured to query or poll the frontend 120, the worker manager 140 (including potentially virtual machine instances of the worker manager 140), or other components of the on-demand code execution system for information regarding calls or executions occurring with respect to calls. Such polling may occur, for example, periodically or on a "just-in-time" basis (e.g., as the information is needed by the task profiler 160). Still further, the interactions of FIG. 3 are described with respect to monitoring calls and executions on the on-demand code execution environment 110, the task profiler 160 may additionally or alternatively be configured to obtain call data from other components, such as auxiliary services 106. For example, where one or more auxiliary services 106 are configured to implement active monitoring of calls as described herein, those auxiliary services 106 may notify the task profiler 106 of calls to the auxiliary services 106 (e.g., alone or with details regarding those calls) in order to facilitate generation of a task profile by the task profiler 160. Thus, the interactions of FIG. 3 are illustrative, rather than exhaustive, in nature.

With reference to FIG. 4, an illustrative set of interactions will be described enabling the on-demand code execution environment 110 to initiate active monitoring on one or more tasks, in order to gather additional data utilized to generate a profile of the task. The interactions of FIG. 4 begin at (1), where the task profiler 160 analyzes data within the task data store 164 to identify a task for active monitoring. In one embodiment, tasks may be identified for active monitoring based on a threshold frequency of calls to the task on the on-demand code execution environment 110 (e.g., as an absolute threshold, a relative threshold versus other calls on the on-demand code execution environment 110, etc.). In other embodiments, tasks may be identified for active monitoring based on other criteria, such as the source of calls to the tasks, the authentication information provided to authorize execution of a task, or calls made from the tasks. For example, where a specific auxiliary service 106 transmits a threshold number of calls to the on-demand code execution environment 110, which correspond to multiple tasks, each of those multiple tasks may be identified for active monitoring. In still more embodiments, multiple criteria may be utilized by the task profiler 160 to identify tasks for monitoring. For example, the task profiler 160 may be configured to identify tasks for active monitoring only when: 1) the task is called with a threshold frequency, 2) a threshold number or percentage of those calls stem from a given source (e.g., an auxiliary service or a task executed on the on-demand code execution environment 110) or utilize given authentication information, and 3) a threshold number or percentage of executions resulting from those calls result in subsequent calls to a given destination (e.g., an auxiliary service or a task executed on the on-demand code execution environment 110). In some embodiments, the same or similar criteria may be utilized to identify which executions of a task are actively monitored. For example, rather than actively monitoring all executions of a given task, the task profiler 160 may identify that only executions of that task that result from a call from a given source should be actively monitored.

Figure 5A:
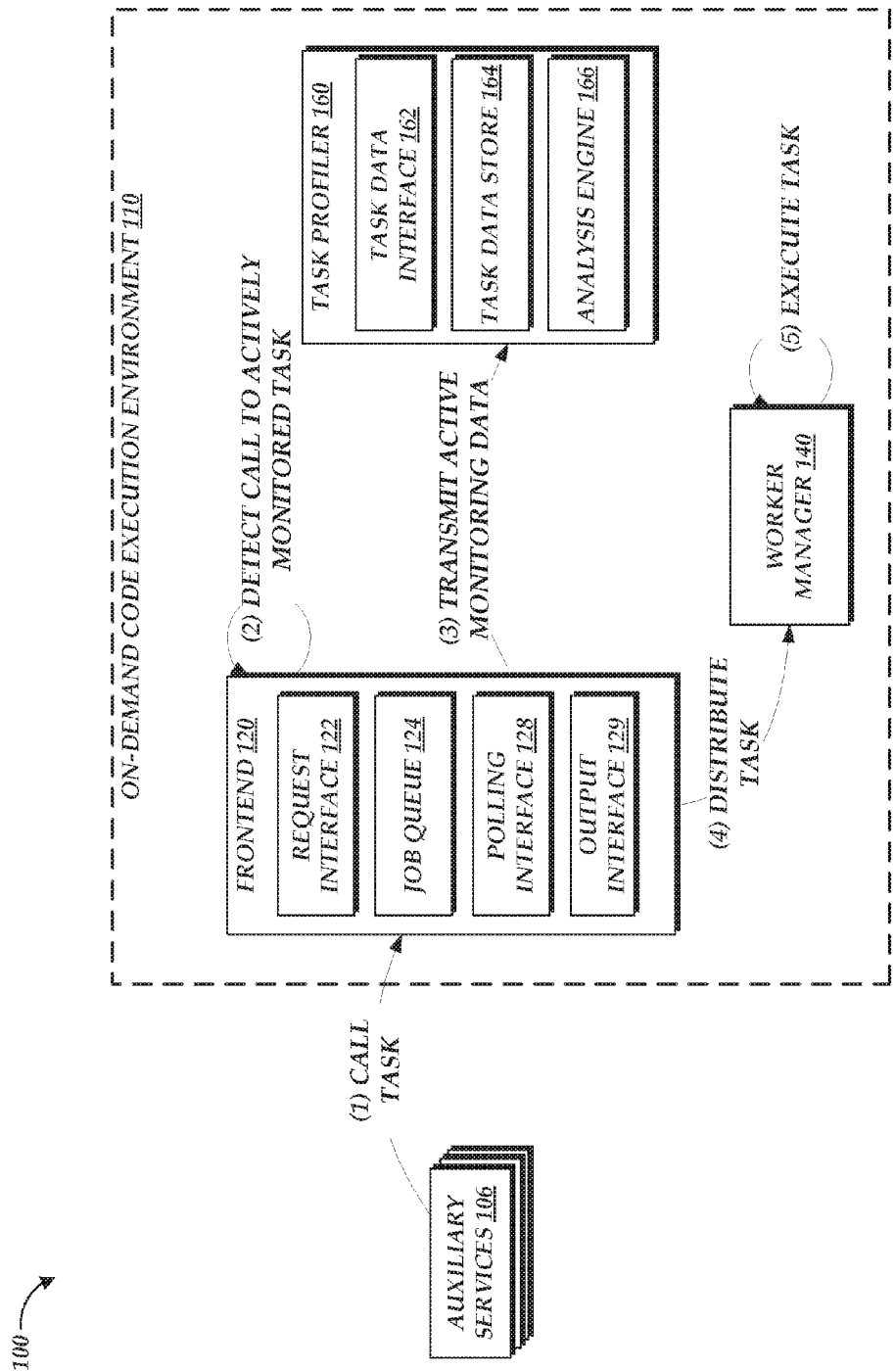
FIGS. 5A and 5B are flow diagrams depicting illustrative interactions for conducting active monitoring on a task by modifying calls to and from that task.
Figure 5B:
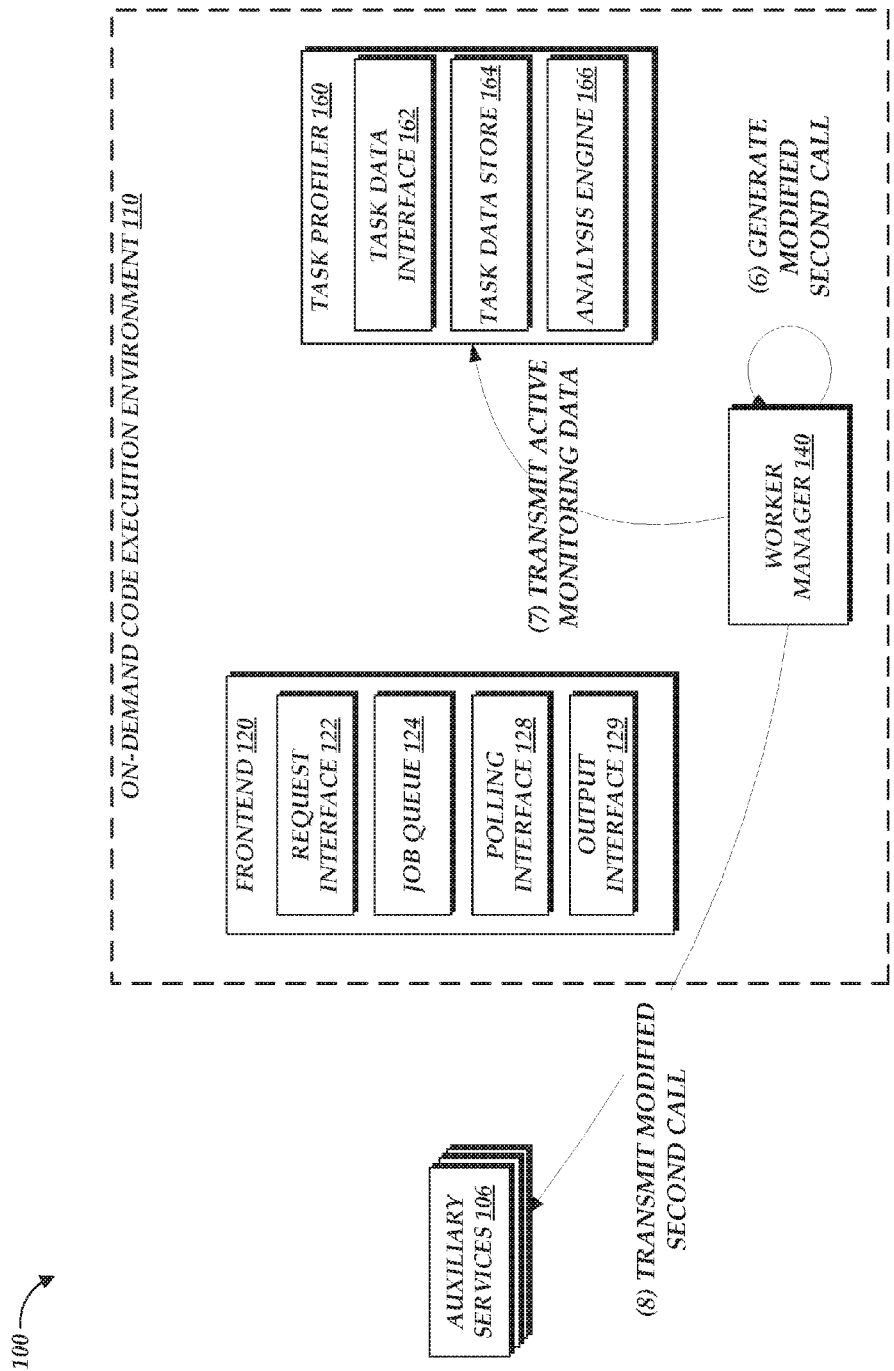

With reference to FIGS. 5A and 5B, a set of interactions will be described for conducting active monitoring on a task within the on-demand code execution environment 110. While the interactions of FIGS. 5A and 5B are divided between those figures for clarity, these interactions are described in conjunction, and the numbering of interactions is maintained between the two figures.

The interactions of FIG. 5A begin at (1), where an auxiliary services 106 transmits a call to the frontend 120 of the on-demand code execution environment 110 to execute a task. In one embodiment, interaction (1) may include transmission of an API call from the auxiliary services 106 to the frontend 120. In another embodiment, interaction (1) may include transmission of data to the frontend 120 (e.g., in response to a request for the data initiated by the polling interface 128) that indicates that execution of a task should occur (e.g., the posting of a new message to a social networking service, the uploading of a file, etc.).

Thereafter, at (2), the frontend 120 detects that the called task has been previously identified for active monitoring. Illustratively, the frontend 120 may maintain (e.g., within a data store not shown in FIG. 5A) a list of tasks marked for active monitoring, and compare the called task to that listing to detect a call to an actively monitored task. In one embodiment, all calls to a specific task may be actively monitored. In another embodiment, calls must meet a set of criteria (e.g., utilizing a specific set of authentication information, coming from a specific source, etc.) to trigger active monitoring. Thus, the frontend 120 may compare data regarding the call to that criteria in order to detect that the call should trigger active monitoring.

At (3), the frontend 120 can transmit active monitoring data regarding the task to the task profiler 160. This active monitoring data may include any data that would otherwise be captured via passive monitoring (e.g., time of the call, parameters, source, authentication information, task called, etc.). In addition, active monitoring data may include data that would not otherwise be captured via passive monitoring. For example, where the call does not yet include a unique identifier, the frontend 120 may assign a unique identifier to the call, such that subsequent calls stemming from execution of the called task may be correlated to the initial call. As a further example, where the on-demand code execution environment 110 is configured not to monitor some information (e.g., function parameters) during passive monitoring, that data may be transmitted to the task profiler 160 during active monitoring.

At (4), the frontend 120 can distribute the task to the worker manager 140 for execution. The work manager 140, in turn, can select a virtual machine instance (not shown in FIG. 5A) to handle the task, and cause the virtual machine instance to execute user code corresponding to the task, at (5). Further details regarding distribution and execution of user code are provided within the '648 application, incorporated by reference above (e.g., at FIG. 4 of the '648 application).

The illustrative interactions described above continue with reference to FIG. 5B, where the worker manager 140 (which may include virtual machine instances executed by the worker manager 140), at (6) generates a call to an auxiliary service 106 that is modified with active monitoring data. Illustratively, the call may be generated based on execution of user code on the worker manager 140 which instructs a virtual machine instance to generate and transmit an API call or an HTTP packet to the auxiliary service 106. In one embodiment, the worker manager 140 may act to "intercept" calls to the auxiliary service 106, such that when execution of user code on a virtual machine instance causes transmission of a call to the auxiliary service 106, the worker manager 140 (e.g., the virtual machine instance, a host computing device to the virtual machine instance, a separate computing device implementing functionality of the worker manager 140, etc.) detects that call, and modifies the call to include active monitoring information within the call. In another embodiment, the user code being executed at the worker manager 140 may itself be modified to cause insertion of active monitoring information into the call. For example, the virtual machine executing the user code may modify parameters or libraries used by the code, such that calls generated to the auxiliary service 106 include active monitoring information without further action being required by the worker manager 140. As described above, modification to a call may include addition of a unique identifier to the call (e.g., a unique identifier previously assigned to the task that generated the call). Further, modification may include insertion of historical information into the call, such as the information regarding the task that generated the call (e.g., identity, time of execution, source of call to that task, etc.) and/or other historical information regarding that task (e.g., past tasks or auxiliary services that preceded the task that generated the call, as well as information regarding those past tasks or auxiliary services).

At (7), the worker manager 140 notifies the task profiler 160 of the secondary call, as well as any active monitoring information inserted into the secondary call (e.g., unique identifier or historical information). The worker manager 140 can also, at (8), transmit the modified secondary call to the destination auxiliary service 106. The interactions of FIGS. 5A and 5B may then end.

One of skill in the art will appreciate that the additional or alternative interactions to those describe in FIGS. 5A and 5B may also occur within the on-demand code execution environment 110. For example, where the call transmitted to the auxiliary service 106, at (9), results in a subsequent call to the on-demand code execution environment '110, the interactions of FIGS. 5A and 5B may be repeated with respect to that call. Moreover, the active tracking information (e.g., previously assigned unique identifier or historical information) previously placed within the calls may be maintained by either or both of the auxiliary service 106 and the on-demand code execution environment, such that the task profiler 160 can correlate the calls as interrelated. While the interactions of FIGS. 5A and 5B are described above with respect to an auxiliary service 106, these interactions may also occur wholly within the on-demand code execution environment 110. For example, a task executed within the on-demand code execution environment 110 may be recursive, such that a first execution of that task calls a second execution of the task, etc. At each call, the on-demand code execution environment 110 may insert or maintain the active monitoring information in the call, and report the calls to the task profiler 160 to generate active monitoring data. While the interactions described with respect to FIGS. 5A and 5B include transmission of notifications to the task profiler 160 (e.g., including active monitoring data), some embodiments of the present disclosure may include a task profiler 160 configured to retrieve such information from the frontend 120, the worker manager 140, other components of the on-demand code execution environment, or auxiliary services 106 themselves. For example, the task profiler 160 may be configured to "poll" these components for information periodically or as the information is required at the task profiler 160. Thus, the interactions of FIGS. 5A and 5B are illustrative in nature.

Figure 6:
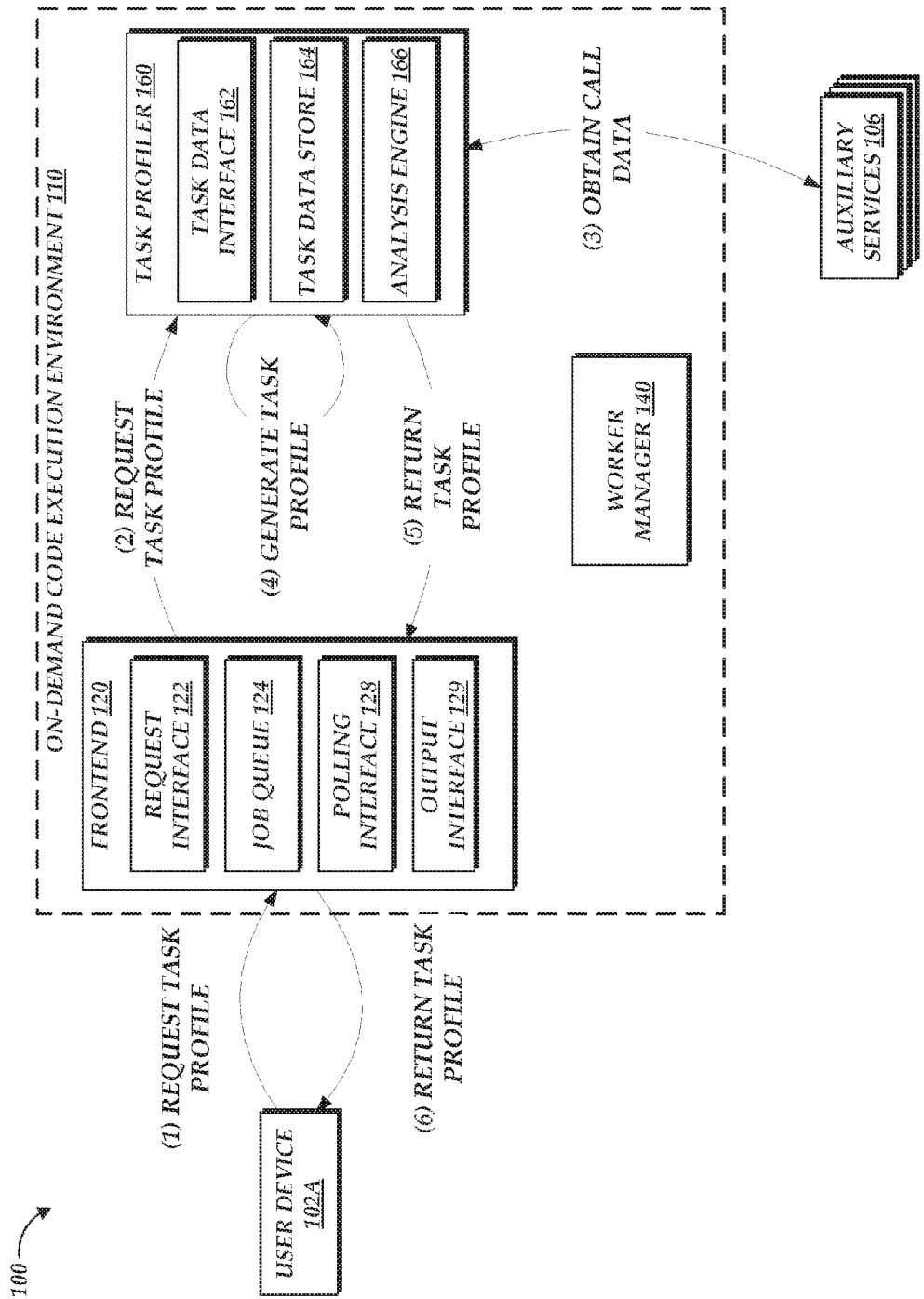
FIG. 6 is a flow diagram depicting illustrative interactions for generating a task profile based on active monitoring data.

With reference to FIG. 6, illustrative interactions for generating a profile of a task executed on the on-demand code execution environment 110 will be described. The interactions of FIG. 6 may occur, for example, subsequent to the interactions described above with reference to FIGS. 3-5B, and may be based on task data gathered at the on-demand code execution environment 110 based on active monitoring of task calls and executions.

The interactions of FIG. 6 begin at (1), where a user device 102A requests a task profile. In one embodiment, the user device 102A may request a complete profile of the task, including data for all executions of the task on the on-demand code execution environment 110. In another embodiment, the user device 102A may specify criteria identifying specific executions of the task to be included in the task profile. Such criteria may include, but is not limited to, a time of task call or execution, credentials (e.g., username) used to invoke the task, or a source of call to the task (e.g., a specific auxiliary service 106, a specific task execution, etc.).

At (2), the frontend 120 passes the request to the task profiler 160, including any criteria indicating specific executions of the task that should be included in the task profile.

The task profiler 160 can then utilize the request (and any criteria) to generate a profile for the task. To do so, the task profiler 160 can first inspect the task data store 164 to identify any data related to execution of the task (and satisfying any provided criteria). Additionally or alternatively to the information within the task data store 164, the task profiler 160 can retrieve data related to calls or executions of tasks from other components either within or outside of the on-demand code execution environment 110. For example, as shown in FIG. 6 as interaction (3), the task profiler 160 can interact with one or more auxiliary services 106 to retrieve call information from those auxiliary services 106 (e.g., when auxiliary services 106 received calls from the on-demand code execution environment 110, from other auxiliary services 106, etc.) Thereafter, the task profiler 160 can utilize data gathered via active monitoring of task calls and executions to correlate those calls and executions, and utilize such correlations to generate a task profile at (4).

For example, where unique identifiers are utilized by the on-demand code execution environment 110 to actively monitor task calls and executions, the task data may indicate the following:

A call to task 'A' was obtained at the on-demand code execution environment 110 at time 1. The call was received from a user computing device 102A and assigned a unique identifier 'ID 1' by the on-demand code execution environment 110. Task 'A' was subsequently executed beginning at time 2, and made calls to both task 'B' and an auxiliary service 'C' at time 3.

A call to task 'B' was obtained at the on-demand code execution environment 110 at time 3. The call was received from the on-demand code execution environment 110, and included the unique identifier 'ID1'. Task 'B' was subsequently executed at time 4, and that execution made no calls to other tasks or auxiliary services.

A call to task 'A' was obtained at the on-demand code execution environment 110 at time 7. The call was received from auxiliary service 'C', and included the unique identifier 'ID1'. Task 'A' was subsequently executed at time 8, and that execution made no calls to other tasks or auxiliary services.

Because each of the above data points is associated with the same unique identifier, the task profiler 160 can determine that each data point is interrelated (e.g., part of the same "thread" of calls and executions). Further, by correlating i) the times at which calls and executions occurred, ii) the sources of call to execute each task, and iii) the calls made by those executions, the task profiler 160 can determine the interactions between the calls. For example, based on the data above, the task profiler 160 can determine that an initial call from user computing device 102A to task 'A' (at time 1) resulted in execution of task 'A', which resulted in calls to both task 'B' and auxiliary service 'C' at time 3, which resulted in both execution of task 'B' (with no subsequent calls) and reception of a new call to task 'A' from auxiliary service 'C', which finally resulted in a second execution of task 'A'. The task profiler 160 can then, at (4), generate a task profile indicating this information. In some embodiments, this information may be represented in a chart or diagram (such as a directed graph), where each node indicates a task or auxiliary service, and where the edges between nodes indicate calls to those tasks or auxiliary services.

As a further example, where active monitoring by the on-demand code execution environment 110 includes embedding historical information within task calls, the task data may indicate the following:

A call to task 'A' was obtained at the on-demand code execution environment 110 at time 1. The call was received from a user computing device 102A, and did not include any historical information. Task 'A' was subsequently executed beginning at time 2, and made calls to both task 'B' and an auxiliary service 'C' at time 3.

A call to task 'B' was obtained at the on-demand code execution environment 110 at time 3. The call was received from the on-demand code execution environment 110, and included historical information indicating that it was generated based on a past execution of task 'A', which in turn was called by user computing device 102A. Task 'B' was subsequently executed at time 4, and that execution made no calls to other tasks or auxiliary services.

A call to task 'A' was obtained at the on-demand code execution environment 110 at time 7. The call was received from auxiliary service 'C', and included historical information indicating that it was generated based on a past call to auxiliary service 'C', which was called by an execution of task 'A', which in turn was called by user computing device 102A. Task 'A' was subsequently executed at time 8, and that execution made no calls to other tasks or auxiliary services.

By utilizing the historical information within each subsequent call, the task profiler 160 can determine that each data point is interrelated (e.g., part of the same "thread" of calls and executions). Specifically, the information above enables the task profiler 160 to determine the same thread of calls and executions described in the prior paragraph, but without requiring the use of a unique identifier. Instead, the historical information embedded within later calls enables the task profiler 160 to determine interrelations that occur prior to those later calls. Beneficially, this may enable the task profiler 160 to determine those interrelations quickly, without requiring high levels of analysis on the logged data.

While the interactions described above are simplified, any number of calls and executions, involving any number of tasks or auxiliary services, may be indicated by task data. Thus, by utilizing task data regarding the calls and executions of tasks (or calls to auxiliary services), the task profiler 160 may assist in determining the interrelations between these calls and executions. While the examples described above relate to using either unique identifiers or historical data exclusively, in some embodiments, the task data may include both unique identifiers and historical data. Further, in some instances, the historical data may be reduced or compacted, to limit the amount of data that is included within calls themselves. For example, rather than indicating a complete chain of calls and executions, the historical data may include only a count of the number of times individual tasks or auxiliary services was called. This compact data may be especially beneficial in instances were a task is called recursively, and therefore may execute a large number of times. In some instances, frequently occurring patterns of task calls may be replaced within historical data with an identifier assigned to that frequently occurring pattern. For example, assume that historical data within a call indicates that execution of a first task called a first auxiliary service, which called a second task, which calls a second auxiliary service, which generated the present call. In such an instance, the pattern within the historical data may be removed and replaced with a path identifier (e.g., "path A") which indicates the pattern (e.g., first task calls first auxiliary service, which calls second task, which calls second auxiliary service). In one embodiment, patterns may be identified and replaced with path identifiers based on a threshold number of occurrences of the pattern with respect to an individual task or a related group of tasks (e.g., within the same "thread" of execution or across multiple threads occurring in parallel, serial, or both). After identification, these patterns may be used to reduce the size of historical information included within the call. These patterns may further be shared by the on-demand code execution environment 110 with other components (e.g., auxiliary services 106) monitoring task calls. In some embodiments, patterns may additionally or alternatively be used to represent information within task profiles themselves. For example, where a task profile includes a graph of task calls, a specific pattern of nodes and edges in the graph may be replaced by a single pattern node, which corresponds to a sub-graph depicting the pattern. Such patterns may be especially useful, for example, where "loops" of nodes and edges occur frequently within the graph. Thus, patterns may be utilized in task profiles to reduce the information stored therein.

In some embodiments, a task profile may be generated based on a single thread or path of executions, like that described above. In other embodiments, the task profile may be generated based on multiple threads or paths of executions. Each thread may be represented individually within the task profile, such that a user may view or visualize each thread. Additionally or alternatively, data regarding each thread may be combined into a single data set within a task profile. Illustratively, such a data set may indicate, for each task or auxiliary service, a percentage of times that task or auxiliary service made a call to another task or auxiliary service. In one embodiment, this data may be represented by a directed graph within the task profile, where the nodes of the graph indicate individual tasks or auxiliary services, where the edges of the graph represent calls to other tasks or auxiliary services, and where those edges are weighted according to a percentage of times that that call was made. Thus, a user may be enabled to quickly understand the general execution paths of a task, based on a collection of large amounts of historical data.

After generating the task profile, the task profiler 160 returns the task profile to the frontend 120, at (5). The frontend 120, in turn, returns the task profile to the user device 102A at (6). Thereafter, the user device 102A may display the task profile to a user, enabling the user to view or visualize the interactions caused by execution of a task on the on-demand code execution environment 110. The interactions of FIG. 6 may then end.

Figure 7:
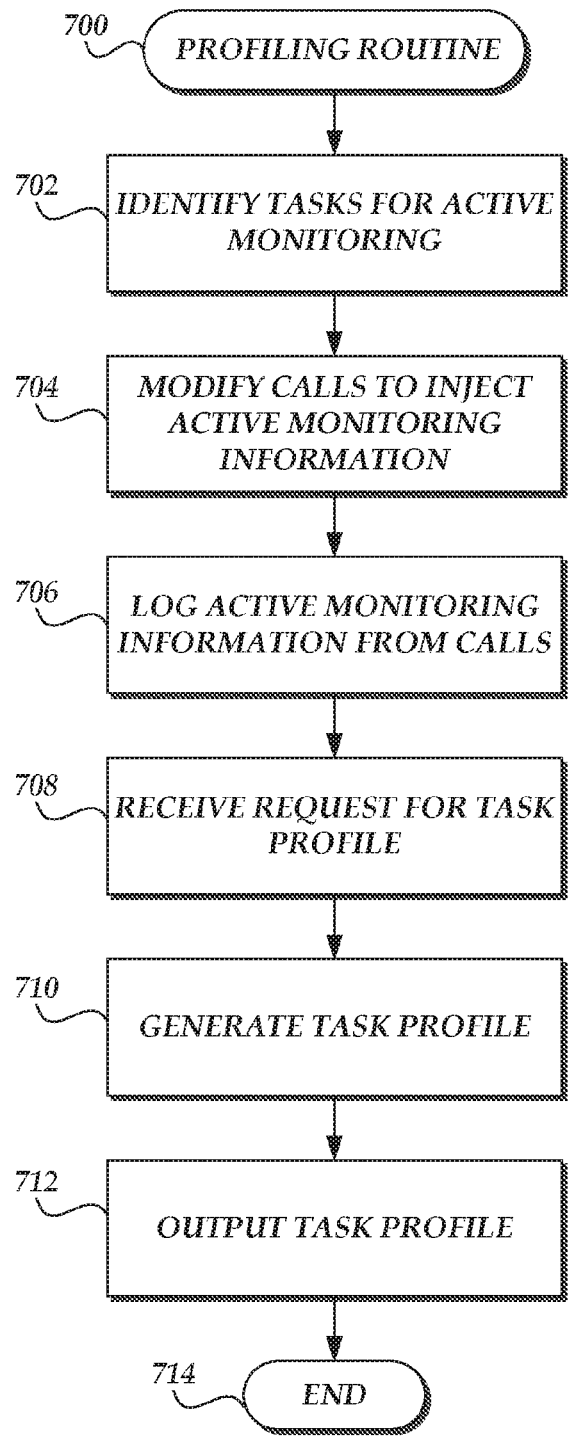
FIG. 7 is a flow chart depicting an illustrative routine for monitoring task executions on the on-demand code execution environment of FIG. 1 to generate a task profile, and provide that task profile to an end user.

With reference to FIG. 7, a block diagram depicting an illustrative routine 700 for generating a task profile based on execution of tasks on an on-demand code execution environment 110 will be described. The routine 700 may be implemented, for example, by the task profiler 160 of FIG. 1, alone or in conjunction with other components of the on-demand code execution environment 110.

The routine 700 begins at block 702, where the task profiler 160 identifies tasks for active monitoring. In one embodiment, identification of tasks may be based on an explicit user request, which specifies criteria for actively monitoring tasks. That criteria may include, but is not limited to, an identity of the task, credentials used to call the task, a time of call to the task (e.g., within certain hours of the day), a source of a call to the task, or parameters used to call the task. For example, a user (via a user computing device 102A) may request that "debugging mode" be turned on for executions of a specific task called by that user. Thus, task profiler 160 may identify all calls to that specific task under the credentials of that user be identified for active monitoring. In another embodiment, tasks may be identified for active monitoring based on frequency, such that if a threshold number of related calls to a task occur at the on-demand code execution environment 110 within a given period of time, that task (or specific executions of that task corresponding to the related calls) are identified for active monitoring. Calls may be related for the purposes of active monitoring based, for example, on credentials used to call the task, a time of call to the task (e.g., within certain hours of the day), a source of a call to the task, or parameters used to call the task. Illustratively, if the frequency of calls to a specific task from a specific auxiliary service exceeds a threshold amount, calls to that task from that auxiliary service may be identified for active monitoring.

At block 704, the task profiler 160 causes the on-demand code execution environment 110 to modify calls to or from actively monitored tasks, to inject active monitoring information into those calls. In one embodiment, this active monitoring information is a unique identifier. In another embodiment, this active monitoring information is historical information regarding the call (e.g., the source of the call, results or timing information of prior executions, etc.). Where a call is not associated with prior active monitoring information, new active monitoring information (e.g., a new unique identifier) may be generated by the on-demand code execution environment 110 and injected into the calls. Where a call is associated with prior active monitoring information, that active monitoring information may be retained and propagated through subsequent calls, to enable interrelations between those calls to be determined.

At block 706, the task profiler 160 records active monitoring information gathered regarding monitored tasks, as well as calls made to or from monitored tasks. Illustratively the active monitoring information may include, for any given execution of a task, a source of a call to execute the task, active monitoring information within that call, details of execution of the task on the on-demand code execution environment 110, calls made from that execution, and active monitoring information injected into those calls.

At block 708, the task profiler 160 receives a request to generate a profile for actively monitored tasks. Illustratively, the request may be generated by a user computing device 102, in order to gain information used to optimize or debug monitored tasks.

At block 710, the task profiler 160 generates a task profile based on the recorded active monitoring information. Specifically, the task profiler 160 may compile previously recorded active monitoring information, and correlate that information to determine a "path" or "thread" of executions or calls caused by a monitored task. The task profiler 160 may additionally generate statistical information regarding that "path" or "thread", such as a directed graph that indicates historical probabilities that execution of a task will result in specific calls to tasks or auxiliary services.

At block 712, the task profiler 160 outputs the task profile to the requesting user. In one embodiment, the task profile may be output in a complete or substantially complete manner, such that the information contained therein is static. In another embodiment, the task profile may be output to the requesting user over time (e.g., as a "data stream"). Illustratively, the task profiler 160 may generate an initial task profile, based on currently available data, and transmit that initial task profile to the user. Thereafter, the task profiler 160 may continuously update the task profile based on newly received data, and transmit updated versions of the task profile to the user. Illustratively, use of a streamed task profile may enable a user to view a "path" of calls and executions in real-time (e.g., immediately after those calls and executions occur on the on-demand code execution environment 110). After outputting the task profile, the routine 700 may end at block 714.

The routine 700 may be altered based on the requirements of the on-demand code execution environment 110. For example, in some embodiments of the present disclosure various functionalities described with respect to the routine 700 may be implemented in parallel, or as separate routines. For example, block 702 may be implemented as a first routine (e.g., running at fixed intervals on the on-demand code execution environment 110 or in response to a user request to enable active monitoring for specific tasks), blocks 704 and 706 may be implemented as a second routine (e.g., running continuously to actively monitor specific calls or executions), and blocks 708 through 712 may be implemented as a third routine implemented in response to user requests to provide task profiles. Division of the routine 700 into multiple parallel routines may advantageously increase the speed of various functionalities of the routine 700, for example, where the on-demand code execution environment 110 utilizes parallel processing techniques. In some embodiments, one or more portions of the routine 700 may be carried out by other systems or devices, including systems or devices external to the on-demand code execution environment, which provide information to the task profiler 700. For example, blocks 702-706 may be implemented (collectively or individually) by a frontend of the on-demand code execution environment 110, while blocks 708-712 are implemented by the task profiler 160 or other component of the on-demand code execution environment 110.

Figure 8B:
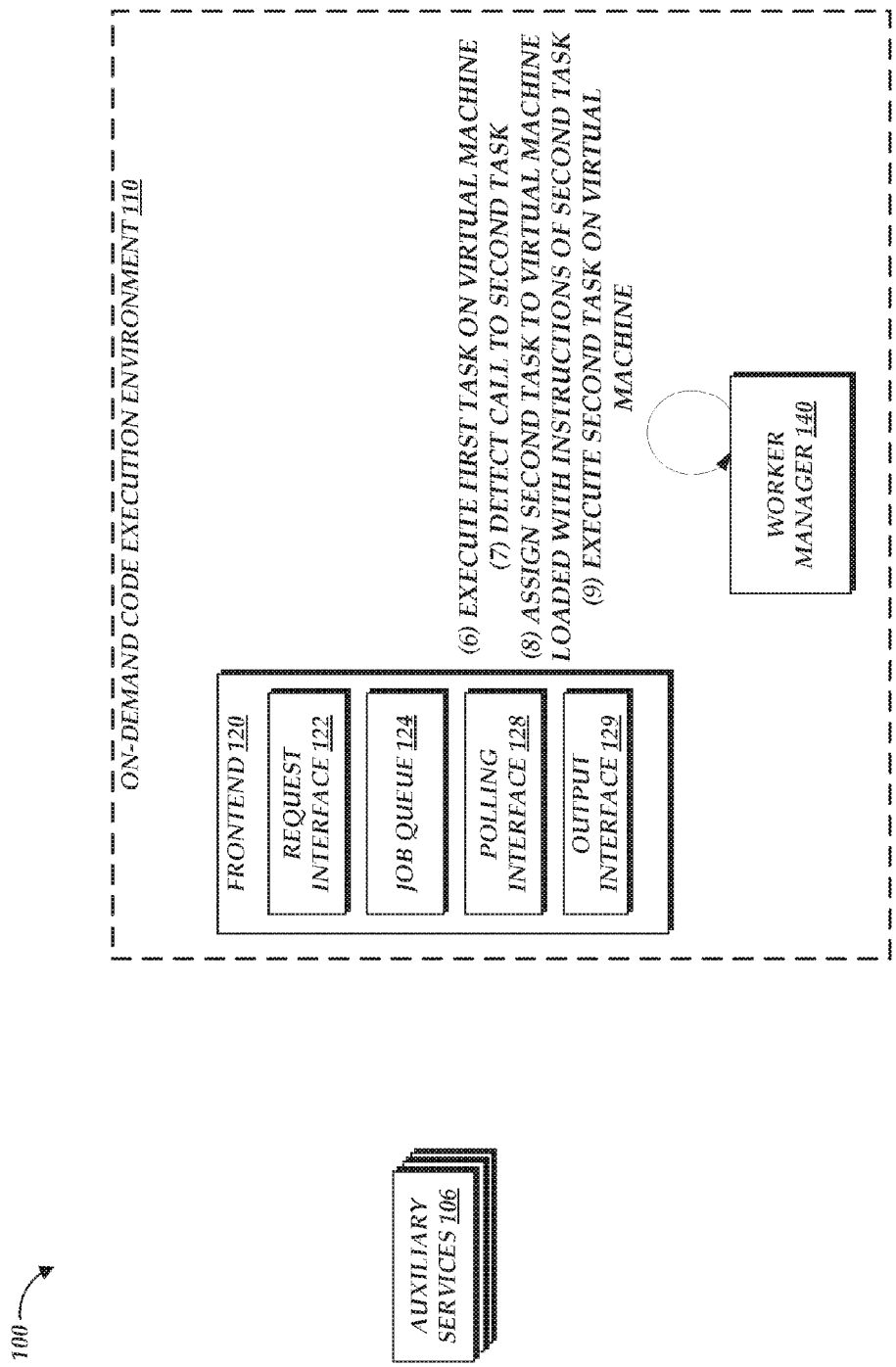

With reference to FIGS. 8A and 8B, illustrative interactions for utilization of a task profile to predictively manage task calls will be described. Specifically, the interactions of FIGS. 8A and 8B can enable the on-demand code execution environment 110, on obtaining a call to a first task, to predict a call to a second task (which may be the same task as the first task or a different task), and to preemptively load code corresponding to the second task onto a virtual machine, such that a call to the second task (if it occurs) can be processed rapidly by the on-demand code execution environment 110. While shown in two figures, the numbering of interactions between FIGS. 8A and 8B is maintained between the figures.

The interactions of FIGS. 8A and 8B begin at (1), where an auxiliary service 106 transmits a call, such as an API call, to a first task to the on-demand code execution environment 110, which is received at the frontend 120. While transmission of a call is shown for illustrative purposes in FIG. 8A, the on-demand code execution environment 110 may obtain a call to a task in a variety of additional or alternative manners (e.g., based on a previous execution of task, based on polling an auxiliary service 106, etc.). Thereafter, at (2), the frontend 120 distributes the task to the worker manager 140.

On receiving instructions to execute the first task, the worker manager 140 interacts with the task profiler 160 to retrieve a task profile for the first task, at (3). As discussed above, the task profile can include statistical information regarding past executions of the first task, including a statistical likelihood that a given past execution of the first task is followed by a call to a second task. Accordingly, at (4), the worker manager 140 determines that execution of the first task is likely to result in a call to a second task. Illustratively, the determination that a call to a second task is likely may include determining that at least a threshold percentage of past executions of the first task resulted in a call to the second task. While not shown in FIG. 8A, the worker manager 140 may additionally apply eligibility criteria to the task profile or the second task, to determine that predictive management of the call to the second task is appropriate. For example, the worker manager 140 may verify that historical calls to the second task have occurred within a threshold time of executing the first task. As a further example, the worker manager 140 may verify that the second task would benefit from predictive management (e.g., preemptively loading code of the second task on a virtual machine, prior to receiving a call to the second task). Illustratively, the worker manager 140 may compare the typical execution time of the second task to the overhead time required to process a call to the second task (e.g., processing the call at the frontend 120, loading a virtual machine with code of the second task, etc.). Where the typical execution time is large compared to the overhead time, it may be unnecessary to predictively manage calls to the second task. As yet another example, the worker manager 140 may verify that preemptive management of calls to the second task is compatible with the functionalities of the first task, the second task, or both. For example, where both the first task and second task run asynchronously, or where both tasks run synchronously, combining the code of the first and second tasks into a single set of executable code may not alter functionality of those tasks. However, where one of the first and second tasks runs asynchronously, and the other runs synchronously, combining the code of the first and second tasks may alter their functionality. Thus, the worker manager 140 may determine that the second task should not be preemptively managed, or that such management should not include combining the code of both tasks into a single set of code (but may include, for example, preemptively loading code of the second task onto a virtual machine).

For the purposes of FIG. 8A, it will be assumed that a call to the first task is likely to result in a call to the second task, and that the tasks satisfy any criteria for predictive management. Thus, at (5), the worker manager 140 can load a virtual machine with computer-executable instructions of both the first and second tasks. Such a virtual machine may be selected, for example, from the active pool 140A or the warming pool 130A of FIG. 1 (neither shown in FIG. 8A). Selection of a virtual machine to which to assign to execution of a task is described in more detail within the '648 Application, incorporated by reference above (e.g., at FIG. 4 of the '648 application). In addition to the considerations described in the '648 Application, the worker manager 140 may additionally select a virtual machine for loading of code of the first and second tasks based on the machine's ability to execute the first and second tasks (e.g., based on appropriate system resources, operating environment, etc.). In one embodiment, a single virtual machine is loaded with the code of both the first and second tasks. In another embodiment, a first virtual machine is loaded with the code of the first task, while a second virtual machine is loaded with the code of the second task. Where the same virtual machine is loaded with code of both tasks, operation of that virtual machine may be modified to facilitate execution of both tasks. For example, the configuration of the virtual machine may be modified such that, if execution of the first task results in generation of a call to the second task, that call is handled locally at the virtual machine (e.g., without transmission to the frontend 120). In one embodiment, the virtual machine may be configured to intercept calls to the second task, and to execute the second task. In another embodiment, the code of both the first and second tasks may be combined, and portions of code that generate a call to the second task (e.g., portions of code that generate an API call to the second task) may be replaced with function calls (or other internal cross references) to code of the second task.

The interactions of FIG. 8A are continued on FIG. 8B, where, at (6), the worker manager 140 causes the selected virtual machine to execute the first task, thus implementing the functionality of the first task at the on-demand code execution system. For the purposes of description, it will be assumed in FIG. 8B that execution of the first task results in a call to execution of the second task. Accordingly, at (7), the worker manager 140 can detect the call to the second task. The worker manager 140 can then, at (8), assign execution of the second task to the virtual machine on which code of the second task was preemptively loaded. At (9), that virtual machine can execute the second task, thus implementing functionality of the second task on the on-demand code execution environment 110. As will be appreciated by the description of FIGS. 8A and 8B, because execution of the second task may be handled completely at the worker manager 140, and because little or no delay need occur to load the virtual machine with the code of the second task, the time required to execute the second task may be reduced significantly, thus improving the performance of the on-demand code execution environment 110.

While illustrative interactions are described above with respect to FIGS. 8A and 8B, additional or alternative interactions may also occur in the context of these figures. For example, where a single virtual machine is loaded with the code of both a first and second task, that virtual machine may not be required to transmit calls to the second task to the worker manager 140 itself. Instead, the virtual machine may be configured to directly execute the second task. Thus, interactions (7) and (8) may be omitted, further reducing time required to process the call to the second task. Either the worker manager 140 or the virtual machine itself may also be configured to notify other components of the on-demand code execution environment 110 regarding execution of the second task (e.g., for billing purposes, capacity management purposes, profile-creation purposes, etc.). For example, the worker manager 140 or the virtual machine may be configured to notify the frontend 120 of a call to or execution of a second task. In some instances, it may be desirable to continue processing of task calls through the frontend 120, rather than allowing the worker manager 140 or virtual machine to manage execution a second task. In such instances, the worker manager 140 or virtual machine may be configured to transmit the call to the second task to the frontend 120 for handling (e.g., in the same manner as a typical task). The frontend 120 may then distribute the task to the worker manager 140, who may utilize a virtual machine previously loaded with code of the second task to execute the second task. Thus, even where management of a call to a second task is processed by the frontend 120, execution of that second task may occur more quickly, because a virtual machine has been preemptively loaded with the code of the second task.

Figure 9A:
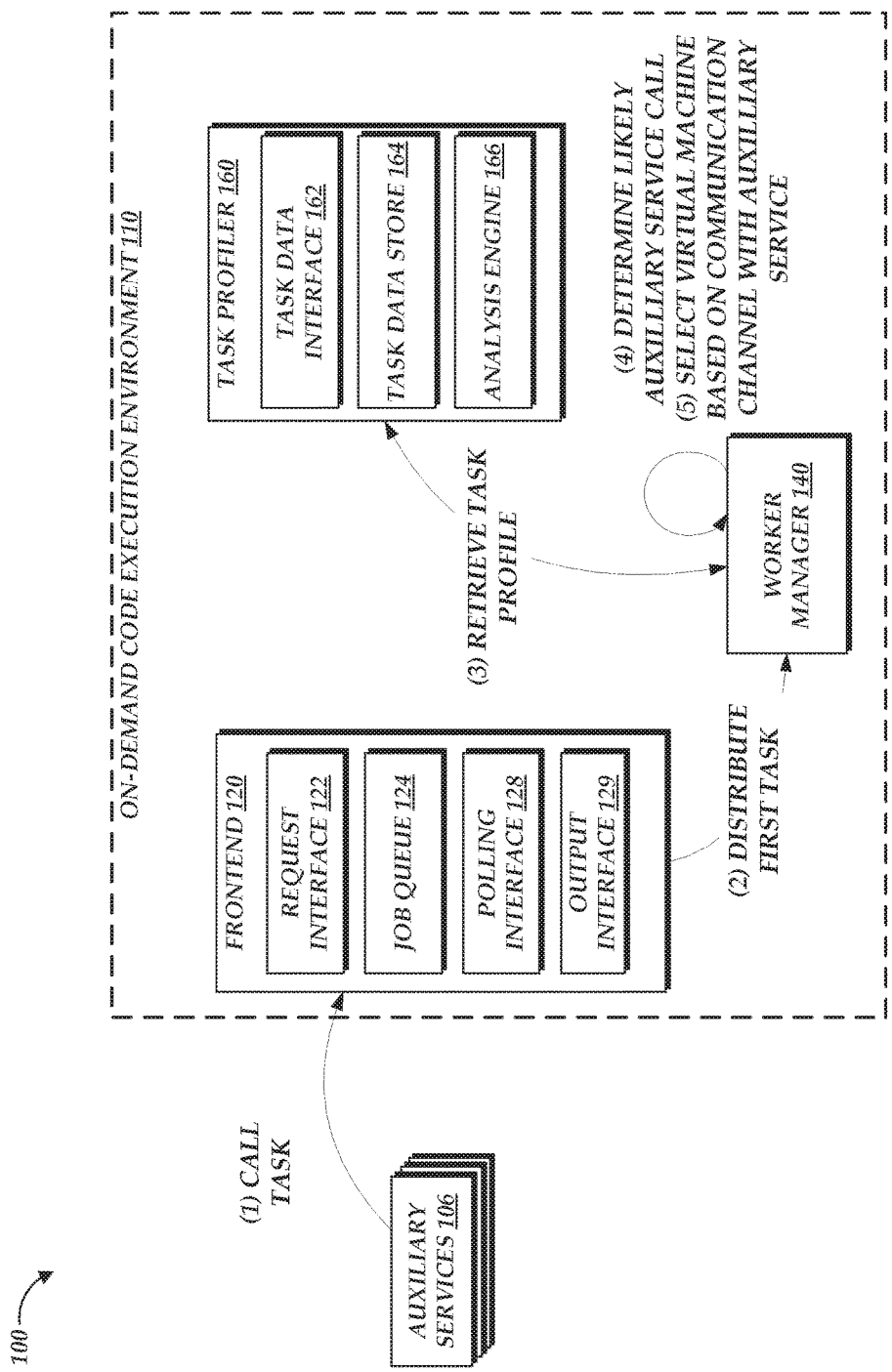
FIGS. 9A and 9B are flow charts depicting illustrative interactions for handling transmission of an auxiliary service call predicted to occur based on execution of a first task.
Figure 9B:
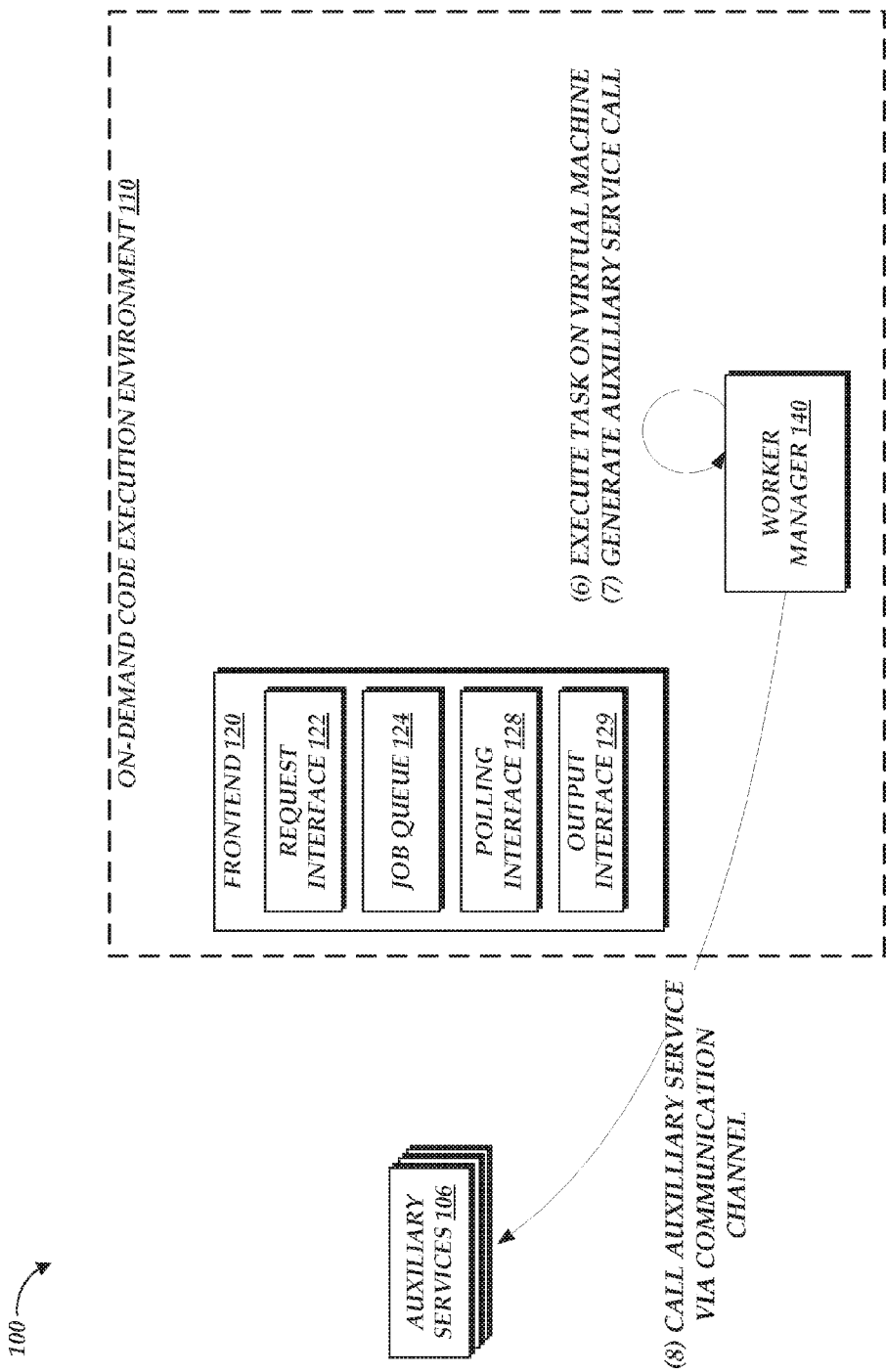

With reference to FIGS. 9A and 9B, illustrative interactions for utilization of a task profile to predictively manage calls to auxiliary services will be described. Specifically, the interactions of FIGS. 8A and 8B can enable the on-demand code execution environment 110, on obtaining a call to a first task, to predict a call to an auxiliary service 106, and to select a virtual machine to execute the first task based on a communication path between the selected virtual machine and the auxiliary service 106, such that a call to the auxiliary service 106 (should it occur) can be transmitted quickly to the auxiliary service 106 over the communication path. While shown in two figures, the numbering of interactions between FIGS. 9A and 9B is maintained between the figures.

The interactions of FIGS. 9A and 9B begin at (1), where an auxiliary service 106 transmits a call, such as an API call, to a first task to the on-demand code execution environment 110, which is received at the frontend 120. While transmission of a call is shown for illustrative purposes in FIG. 8A, the on-demand code execution environment 110 may obtain a call to a task in a variety of additional or alternative manners (e.g., based on a previous execution of task, based on polling an auxiliary service 106, etc.). Thereafter, at (2), the frontend 120 distributes the task to the worker manager 140.

On receiving instructions to execute the first task, the worker manager 140 interacts with the task profiler 160 to retrieve a task profile for the first task, at (3). As discussed above, the task profile can include statistical information regarding past executions of the first task, including a statistical likelihood that a given past execution of the first task is followed by a call to a second task. Accordingly, at (4), the worker manager 140 determines that execution of the first task is likely to result in a call to an auxiliary service 106. Illustratively, the determination that a call to an auxiliary service 106 is likely may include determining that at least a threshold percentage of past executions of the first task resulted in a call to the auxiliary service 106. While not shown in FIG. 9A, the worker manager 140 may additionally apply eligibility criteria to the task profile or the call to the auxiliary service 106, to determine that predictive management of the call to the auxiliary service 106 is appropriate. For example, the worker manager 140 may verify that the auxiliary service 106 has been designated (e.g., by an administrator of the on-demand code execution environment) as eligible for predictive management.

For the purposes of FIG. 9A, it will be assumed that a call to the first task is likely to result in a call to the auxiliary service 106, and that the call to the auxiliary service 106 satisfies any criteria for predictive management. Thus, at (5), the worker manager 140 can select a virtual machine to execute the first task based on available communications paths between the selected virtual machine and the auxiliary service 106. In one embodiment, the worker manager 140 can select a virtual machine based on a network distance between that virtual machine and the auxiliary service 106. Generally described, network distance can describe aspects of a communication path between two devices, such as the latency of the communication path (e.g., the time required to transmit information from one device to the other) or the number of "hops" along the path (e.g., the number of intermediary devices). In another embodiment, the worker manager 140 can select a virtual machine based on a communication path quality, which may include any individual metric or combination of metrics regarding the communication path between the virtual machine and the auxiliary service 106, including but not limited to network distance, bandwidth, and reliability. In other embodiments, one or more virtual machines on the on-demand code execution environment 110 may be designated as preferred to communicate with the auxiliary service 106. For example, one or more virtual machines may maintain persistent connections to the auxiliary service 106, or may be executed by host devices that maintain persistent connections to the auxiliary service 106. The use of such a persistent connection can allow a call to the auxiliary service 106 to be transmitted without a delay that may be caused to establish a connection. As a further example, one or more virtual machines may be configured to communicate with the auxiliary service 106 via a specialized protocol. For example, where the auxiliary service 106 and the on-demand code execution environment 110 are operated by the same, related, or cooperating entities, the auxiliary service 106 and on-demand code execution environment 110 may be configured allow use of a high-speed communication protocol, or to allow communication via a private network. Thus, the worker manager 140 may select a virtual machine to execute the first task that utilizes such a high-speed protocol or private network to communication with the auxiliary service 106. In addition to the considerations described herein, selection of a virtual machine may also utilize any of the considerations described within the '648 Application, incorporated by reference above (e.g., at FIG. 4 of the '648 application).

The interactions of FIG. 9A are continued on FIG. 9B, where, at (6), the worker manager 140 causes the selected virtual machine to execute the first task, thus implementing the functionality of the first task at the on-demand code execution system. For the purposes of description, it will be assumed in FIG. 9B that execution of the first task results in generation of a call to execution of the auxiliary service 106, at (7). Thereafter, at (8), the virtual machine executing the first task can transmit the generated call to the auxiliary service 106 to the auxiliary service 106, via a communication path to the auxiliary service 106. As described above, such a communication path may be selected based on network distance or network quality metrics, or may include the use of specialized protocols or private networks, thereby increasing the speed or reliability by which the call can be transmitted to the auxiliary service 106.

While illustrative interactions are described above with respect to FIGS. 9A and 9B, additional or alternative interactions may also occur in the context of these figures. For example, rather than utilizing a virtual machine with a pre-existing connection to an auxiliary service 106, the worker manager 140 may instruct a virtual machine to preemptively establish a connection to the auxiliary service 106 before or during execution of the first task, such that should a call to the auxiliary service 106 occur, that call may be transmitted to the auxiliary service 106 via the pre-established connection. Moreover, while direct communication between the auxiliary service 106 and the worker manager 140 (e.g., including the virtual machine on which the first task is executed) is shown in FIG. 9B, such direct communication may not be required. For example, in some embodiments, the virtual machine may transmit the call to the auxiliary service 106 to the frontend 120, which may transmit the call to the auxiliary service 106. Illustratively, the frontend 120 may utilize a preferred communication channel (e.g., utilizing a specialized protocol or private network) to transmit the call to the auxiliary service 106. Thus, the interactions of FIGS. 9A and 9B should be viewed as illustrative in nature.

Figure 10:
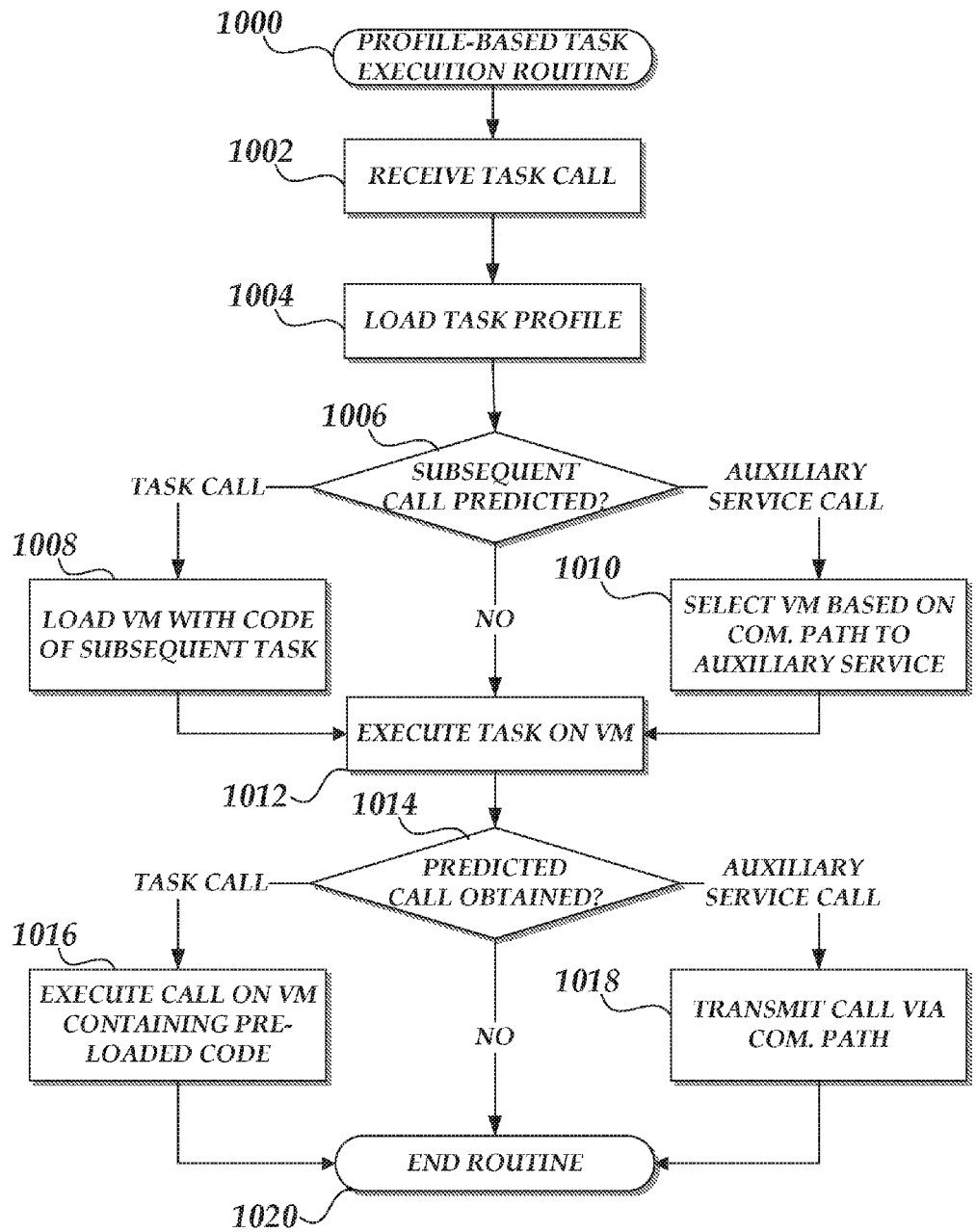
FIG. 10 is a flow chart depicting an illustrative routine for utilizing a task profile to predictively manage calls based on an initial call and a task profile related to the initial call.

With reference to FIG. 10, a block diagram depicting an illustrative routine 1000 for predictively managing calls on an on-demand code execution environment 110 based on a task profile will be described. The routine 1000 may be implemented, for example, by the worker manager 140 of FIG. 1, alone or in conjunction with other components of the on-demand code execution environment 110.

The routine 1000 begins at block 1002, where the worker manager 140 obtains a call to a first task. As described above, such a call may be generated based on execution of a prior task on the on-demand code execution environment 110, based on transmission of an API call or other communication to the on-demand code execution environment 110, based on polling of an auxiliary service 106 by the on-demand code execution environment 110, etc.

At block 1004, the worker manager 140 loads a task profile of the first task. The task profile may be maintained, for example, by the task profiler 160. Thus, implementation of block 1004 may include communicating with the task profiler 160 to retrieve the task profile of the first task. Thereafter, at block 1006, the worker manager 140 determines, based on the task profile, whether a subsequent call is likely to be generated based on execution of the first task. In one embodiment, the determination of block 1006 may include analyzing or reviewing statistical information within the task profile to determine that historical executions of the first task have resulted in subsequent calls in at least a threshold percentage of instances. Implementation of block 1006 may further include determining that a predicted subsequent call satisfies other criteria, such as timing criteria, or eligibility criteria. For example, where a predicted subsequent call is to a second task, eligibility criteria may be satisfied by determining that predictive management of the second task will not interfere with functionality of the first or second task. Where the predicted subsequent call is to an auxiliary service 106, eligibility criteria may be satisfied by determining that the called auxiliary service 106 is one of a number of auxiliary services 106 designated as eligible by an administrator of the on-demand code execution environment 110.

If, at block 1006, the worker manager 140 determines that a subsequent call is likely, and that such a call is a call to another task on the on-demand code execution environment 110, the routine 1000 continues to block 1008, where a virtual machine is loaded with code of the task predicted to be called. In one embodiment, the code of the predicted task is loaded onto the same virtual machine assigned to execute the initially called task, and may be combined with the code of the initially called task. In another embodiment, the code is loaded onto a different virtual machine than is assigned to execute the initially called task. \

If, at block 1006, the worker manager 140 determines that a subsequent call is likely, and that such a call is a call to an auxiliary service 106, the routine 1000 continues to block 1010, where a virtual machine is selected for execution of the initially called task based on a communication path to an auxiliary service. In one embodiment, the virtual machine may be selected based on a determination that a communication path between the selected virtual machine and the auxiliary service 106 satisfies network distance metrics (e.g., number of hops, latency) or network quality metrics (network distance, bandwidth, reliability, etc.). Additionally or alternatively, the virtual machine may be selected based on the ability of the selected virtual machine to communicate with the auxiliary service 106 via a pre-established connection, via a private network, or via specific communication protocols.

Thereafter, the routine 1000 continues to block 1012, where the initially called task is executed on a selected virtual machine. Illustratively, the selected virtual machine may be provisioned with code of the initially called task, and execute that code, in order to implement functionality of the first task.

At block 1014, the worker manager 140 can determine whether the predicted subsequent call occurred based on execution of the initially called task. If so, and if the predicted subsequent call is a call to a second task, the routine continues at block 1016, where the called second task is executed on the virtual machine that was preemptively loaded with code of the second task. Because this virtual machine has been pre-loaded with code of the second task, execution of the second task can occur more quickly than would otherwise be possible on the on-demand code execution environment 110.

If, at block 1014, the worker manager determines that a predicted subsequent call has occurred, and that the predicted subsequent call is a call to an auxiliary service 106, the routine 1000 continues to block 1018, where the subsequent call is transmitted to the auxiliary service 106 via a communication path between the virtual machine executing the initial task and the auxiliary service 106. Because the virtual machine executing the initial task was previously selected based at least in part on that a communication path, transmission of the subsequent call to the auxiliary service 106 may occur more quickly or reliably than would occur during normal operation of the on-demand code execution environment 110.

After implementation of blocks 1016 or 1018, or if the predicted subsequent call is not obtained, the routine 1000 can then end at block 1020.

The routine 1000 may be altered based on the requirements of the on-demand code execution environment 110. For example, in some embodiments of the present disclosure various functionalities described with respect to the routine 1000 may be implemented in parallel, or as separate routines. For example, blocks 1002 through 1012 may be implemented as a first routine (e.g., in response to obtaining an initial task call), and blocks 1014 through 1020 may be implemented as a second routine (e.g., during execution of the initially called task). In some embodiments, one or more portions of the routine 1000 may be carried out by other systems or devices, including systems or devices external to the on-demand code execution environment. For example, blocks 1002 through 1010 may be implemented (collectively or individually) by a frontend 120 of the on-demand code execution environment 110, while blocks 1014 through 1020 are implemented by the worker manger 140 or other component of the on-demand code execution environment 110. While the routine 1000 is described above as predictive of a subsequent call to either a task or an auxiliary service 160, in some instances, a task profile may indicate that a call to a first task may result in subsequent calls to both a second task and an auxiliary service. Thus, implementation of the routine 1000 may include implementation of both blocks 1008 and 1010 and/or block 1016 and 1018. Accordingly, the description of the routine 1000 should be viewed as illustrative in nature.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for monitoring code execution in an on-demand code execution environment, the on-demand code execution environment comprising at least one virtual machine instance executing an initialized operating system and awaiting requests to execute user-specified code within that operating system, the method comprising:
as implemented by one or more computing devices configured with specific computer-executable instructions,
determining a task on the on-demand code execution environment to be actively monitored, wherein the task corresponds to a set of user-defined code executable by the virtual machine instance, and wherein the task is determined based at least in part on a frequency of service calls to the task received at the on-demand code execution environment, each service call requesting execution of the task at the on-demand code execution environment;
associating an individual execution of the task on the on-demand code execution environment with active monitoring information, wherein the active monitoring information identifies the individual execution of the task;
modifying a service call, generated by the individual execution of the task, to include the active monitoring information, wherein the service call invokes at least one of an external service or the on-demand code execution environment;

identifying subsequent service calls, received at the on-demand code execution environment, that include the active monitoring information;
associating the subsequent service calls that include the active monitoring information with the individual execution of the task;
receiving a request to generate a profile from the task;
generating a task profile based at least in part on the individual execution of the task and on the subsequent service calls that include the active monitoring information, wherein the task profile indicates a relationship between the individual execution and the subsequent service calls; and
transmitting the task profile to a computing device of a requesting user for display to the requesting user.

2. The computer-implemented method of claim 1, wherein the task to be actively monitored is identified based at least in part on one or more of an identifier of the task, a source from which calls to the task are received, credentials used to call the task, a timing of calls to the task, parameters included within calls to the task, or information associated with the set of user-defined code corresponding to the task.

3. The computer-implemented method of claim 1, wherein the active monitoring information includes an identifier assigned to the individual execution of the task and to additional executions of tasks caused by the individual execution.

4. The computer-implemented method of claim 1, wherein the active monitoring information includes historical information regarding the individual execution of the task.

5. The computer-implemented method of claim 4, wherein the historical information includes at least one of a source from which a call causing the individual execution was received, prior service calls related to the call to the individual execution, a timing of the prior service calls, or parameters included within the call causing the individual execution.

6. The computer-implemented method of claim 4, wherein the prior service calls are identified within the historical information by a pattern identifier corresponding to the prior service calls.

7. The computer-implemented method of claim 1, wherein the task profile includes a directed graph identifying the individual execution of the task and additional executions of tasks caused by the individual execution.

8. The computer-implemented method of claim 7, wherein nodes of the directed graph identify at least one of individual tasks on the on-demand code execution environment or individual services external to the on-demand code execution environment, and wherein edges of the directed graph indicate calls between the respective individual tasks or individual services.

9. The computer-implemented method of claim 7, wherein at least one node of the directed graph identifies a pattern of calls to one or more tasks on the on-demand code execution environment, one or more services external to the on-demand code execution environment, or a combination thereof.

10. A system for monitoring code execution in a distributed code execution environment, the system comprising:
a computing device comprising a processor coupled to a memory, the memory including specific instructions to cause the computing system to:
determine a task on the distributed code execution environment to be actively monitored, wherein the task corresponds to a set of user-defined code executable within the distributed code execution environment;
associate an individual execution of the task on the distributed code execution environment with active monitoring information, wherein the active monitoring information identifies the individual execution of the task;
modify a service call, generated by the individual execution of the task, to include the active monitoring information, wherein the service call invokes at least one of an external service or the distributed code execution environment;
identify subsequent service calls, received at the distributed code execution environment, that include the active monitoring information;
associate the subsequent service calls that include the active monitoring information with the individual execution of the task;
receive a request to generate a profile from the task;
generate a task profile based at least in part on the individual execution of the task and on the subsequent service calls that include the active monitoring information, wherein the task profile indicates a relationship between the individual execution and the subsequent service calls; and
transmit the task profile to a computing device of a requesting user for display to the requesting user.

11. The system of claim 10, wherein the specific instructions further cause the computing device to identify the task based at least in part on instructions from the requesting user to initiate active monitoring on the task.

12. The system of claim 10, wherein the specific instructions further cause the computing device to identify the task based at least in part on a frequency of service calls to the task.

13. The system of claim 10, wherein the individual execution of the task corresponds to a first individual execution of the task, and wherein the specific instructions further cause the computing device to:
identify a second individual execution of the task on the distributed code execution environment;
determine that the second individual execution of the task is not associated with the active monitoring information;
associate the second individual execution of the task with second active monitoring information, wherein the second active monitoring information identifies the second individual execution of the task as unrelated to the first individual execution of the task;
modify a service call generated by the second individual execution of the task to include the second active monitoring information;
identify subsequent service calls, received at the distributed code execution environment, that include the second active monitoring information; and
associate the subsequent service calls that include the second active monitoring information with the second individual execution of the task.

14. The system of claim 13, wherein the task profile is further generated based at least in part on the second individual execution of the task and on the subsequent service calls that include the second active monitoring information, and indicates a relationship between the second individual execution and the subsequent service calls that include the second active monitoring information.

15. The system of claim 10, wherein the task profile indicates a set of service calls made based on a plurality of executions of the task.

16. The system of claim 10, wherein the task profile indicates a probability that a given execution of the task will result in an individual service call from the set of service calls made based on the plurality of executions of the task.

17. Non-transitory, computer-readable storage media comprising computer-executable instructions for monitoring code execution in a distributed code execution environment, wherein the computer-executable instructions, when executed by a computer system, cause the computer system to:

determine a task on the distributed code execution environment to be actively monitored, wherein the task corresponds to a set of user-defined code executable within the distributed code execution environment;

associate an individual execution of the task on the distributed code execution environment with active monitoring information, wherein the active monitoring information identifies the individual execution of the task;

modify a service call, generated by the individual execution of the task, to include the active monitoring information, wherein the service call invokes at least one of an external service or the distributed code execution environment;

associate subsequent service calls, received at the distributed code execution environment, that include the active monitoring information with the individual execution of the task;

generate a task profile based at least in part on the individual execution of the task and on the subsequent service calls that include the active monitoring information, wherein the task profile indicates a relationship between the individual execution and the subsequent service calls; and transmit the task profile to a computing device of a requesting user for display to the requesting user.

18. The non-transitory, computer-readable storage media of claim 17, wherein the task profile is generated based on a request from the computing device of the requesting user.

19. The non-transitory, computer-readable storage media of claim 17, wherein the computer-executable instructions cause the computer system to repeatedly update the task profile as new service calls that include the active monitoring information are obtained, and repeatedly transmit updates to the task profile to the computing device of the requesting user.

20. The non-transitory, computer-readable storage media of claim 17, wherein the individual execution of the task corresponds to a first individual execution of the task, and wherein the computer-executable instructions further cause the computer system:

identify a second individual execution of the task on the distributed code execution environment;

determine that the second individual execution of the task is not associated with the active monitoring information;

associate the second individual execution of the task with second active monitoring information, wherein the second active monitoring information identifies the second individual execution of the task as unrelated to the first individual execution of the task;

modify a service call generated by the second individual execution of the task to include the second active monitoring information;

identify subsequent service calls, received at the distributed code execution environment, that include the second active monitoring information; and associate the subsequent service calls that include the second active monitoring information with the second individual execution of the task.

21. The non-transitory, computer-readable storage media of claim 20, wherein the task profile is further generated based at least in part on the second individual execution of the task and on the subsequent service calls that include the second active monitoring information, and indicates a relationship between the second individual execution and the subsequent service calls that include the second active monitoring information.

22. The non-transitory, computer-readable storage media of claim 17, wherein the task profile indicates a set of service calls made based on a plurality of executions of the task, and wherein the task profile indicates a probability that a given execution of the task will result in an individual service call from the set of service calls made based on the plurality of executions of the task.

23. The non-transitory, computer-readable storage media of claim 17, wherein the computer-executable instructions cause the computer system to modify the service call, generated by the individual execution of the task, to include the active monitoring information at least in part by at least one of modifying code corresponding to the task, modifying a library referenced by the code, or intercepting the service call generated by the individual execution of the task to insert monitoring information into the service call.

* * * * *